United States Patent
Liu et al.

(10) Patent No.: US 10,390,219 B2
(45) Date of Patent: Aug. 20, 2019

(54) ADDRESSING METHOD AND ADDRESSING DEVICE

(71) Applicant: CHINA ACADEMY OF TELECOMMUNICATIONS TECHNOLOGY, Beijing (CN)

(72) Inventors: Jiamin Liu, Beijing (CN); Fei Qin, Beijing (CN); Yuan He, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/515,588

(22) PCT Filed: Aug. 25, 2015

(86) PCT No.: PCT/CN2015/088046
§ 371 (c)(1),
(2) Date: Mar. 29, 2017

(87) PCT Pub. No.: WO2016/054953
PCT Pub. Date: Apr. 14, 2016

(65) Prior Publication Data
US 2017/0303116 A1    Oct. 19, 2017

(30) Foreign Application Priority Data
Oct. 11, 2014    (CN) .......................... 2014 1 0535631

(51) Int. Cl.
*H04W 8/00* (2009.01)
*H04W 8/26* (2009.01)
(Continued)

(52) U.S. Cl.
CPC ........... *H04W 8/26* (2013.01); *H04L 63/0471* (2013.01); *H04L 63/0492* (2013.01); *H04W 4/02* (2013.01); *H04W 24/10* (2013.01); *H04W 88/02* (2013.01)

(58) Field of Classification Search
CPC ......... H04W 8/26; H04W 4/02; H04W 24/10; H04W 88/02; H04L 63/0471; H04L 63/0492
See application file for complete search history.

(56) References Cited

U.S. PATENT DOCUMENTS

2010/0202374 A1    8/2010    Aramoto
2011/0287785 A1    11/2011    Hu et al.
(Continued)

FOREIGN PATENT DOCUMENTS

CN    101534500 A    9/2009
CN    101690313 A    3/2010
(Continued)

OTHER PUBLICATIONS

International Search Report for PCT/CN2015/088046 dated Nov. 30, 2015 and its English translation provided by WIPO.
(Continued)

*Primary Examiner* — Khai M Nguyen
(74) *Attorney, Agent, or Firm* — Ladas & Parry, LLP

(57) ABSTRACT

An addressing method is provided, including: determining, by a UE, configuration information of an uplink position signal; and transmitting, by the UE, the uplink position signal carrying an identifier of the UE to a network side in accordance with the determined configuration information, to enable the network side to determine addressing information of the UE in accordance with the identifier of the UE, (Continued)

and address the UE in accordance with the identifier and the addressing information of the UE in the case that it is necessary to address the UE.

8 Claims, 9 Drawing Sheets

(51) Int. Cl.
*H04L 29/06* (2006.01)
*H04W 4/02* (2018.01)
*H04W 24/10* (2009.01)
*H04W 88/02* (2009.01)

(56) References Cited

U.S. PATENT DOCUMENTS

| | | | | |
|---|---|---|---|---|
| 2014/0106774 A1* | 4/2014 | Siomina | ............... | H04W 64/00 455/456.1 |
| 2016/0095092 A1* | 3/2016 | Khoryaev | ............. | H04W 76/14 370/329 |
| 2017/0150517 A1* | 5/2017 | Lu | ..................... | H04W 72/1278 |

FOREIGN PATENT DOCUMENTS

| | | |
|---|---|---|
| CN | 101800973 A | 8/2010 |
| CN | 102104867 A | 6/2011 |

OTHER PUBLICATIONS

Written Opinion of the International Search Authority for PCT/CN2015/088046 dated Nov. 30, 2015 and its English translation provided by WIPO.

* cited by examiner

ADDRESSING METHOD AND ADDRESSING DEVICE

CROSS-REFERENCE TO RELATED APPLICATIONS

The present disclosure is the U.S. national phase of PCT Application No. PCT/CN2015/088046 filed on Aug. 25, 2015, which claims the priority to the Chinese patent application No. 201410535631.3 filed on Oct. 11, 2014, the disclosures of which are incorporated herein by reference in their entireties.

TECHNICAL FIELD

The present disclosure relates to the field of communication technology, in particular to an addressing method and an addressing device.

BACKGROUND

For a future mobile communication system, more and more access nodes will inevitably be introduced, i.e., an Ultra Dense Network (UDN) will emerge, so as to meet the user's requirement in a better manner as well as to remarkably increase the network capacity and throughput.

In a UDN architecture, there is a small distance between the deployed nodes and each node has a small coverage, so the number of the access nodes is extremely large and a resultant network structure is more complex. At this time, such a problem in mobility management may occur. In order to perform mobility management on the UDN efficiently and improve the overall performance and efficiency of the UDN, cell virtualization may be adopted. In this way, it is able to weaken the identification of a user equipment (UE) on each single cell and region information, thereby to enable the UE to manage and move in a larger virtual region.

However, during the cell virtualization operation in the UDN architecture, a cell identifier and region information may change significantly, and it may be unnecessary for the UE to identify the cell any more. Instead, it is merely necessary for the UE to transmit data efficiently through available resources. Hence, in the UDN architecture, a conventional method of managing and addressing UE's position and attribution at a network side is no longer applicable, and there is an urgent need to find a new scheme to address the UE at the network side so as to complete various called services.

SUMMARY

An object of the present disclosure is to provide an addressing method and an addressing device, so as to address the UE that uses the services provided by the UDN on which the cell virtualization operation has been made.

The present disclosure provides an addressing methods and an addressing device as follows.

In one aspect, the present disclosure provides in some embodiments an addressing method, including: determining, by a UE, configuration information of an uplink position signal; and transmitting, by the UE, the uplink position signal carrying an identifier of the UE to a network side in accordance with the determined configuration information, so as to enable the network side to determine addressing information of the UE in accordance with the identifier of the UE, and address the UE in accordance with the identifier and the addressing information of the UE in the case that it is necessary to address the UE.

According to the embodiments of the present disclosure, the identifier of the UE is carried in the determined uplink position signal and reported to the network side. The network side may determine the addressing information of the UE in accordance with the identifier of the UE and, in the case that it is necessary for the network side to address the UE, the network side may address the UE in accordance with the identifier of the UE and the determined addressing information of the UE. In this way, it is unnecessary for the UE to identify a cell, and thus it is able to address the UE that uses services provided by a virtualized UDN.

In a first implementation based on the first aspect, determining by the UE the configuration information of the uplink position signal includes: receiving, by the UE, the configuration information of the uplink position signal issued by the network side; or interacting, by the UE, with the network side to determine the configuration information of the uplink position signal.

In a second implementation based on the first aspect, prior to transmit by the UE the uplink position signal carrying an identifier of the UE to the network side in accordance with the determined configuration information, the addressing method further includes: enabling, by the UE, a function of transmitting the uplink position signal in accordance with a signaling received from the network side after it has determined that the function of transmitting the uplink position signal needs to be enabled.

In a third implementation based on the second implementation of the first aspect, the UE determines that the function of transmitting the uplink position signal needs to be enabled after it has received one of a predetermined common signaling and a signaling instructing the UE to enable the function of transmitting the uplink position signal.

In a fourth implementation based on the first aspect, transmitting by the UE the uplink position signal carrying the identifier of the UE to the network side in accordance with the determined configuration information includes: transmitting, by the UE, the uplink position signal periodically carrying an identifier of the UE to the network side in accordance with the determined configuration information; or transmitting, by the UE, the uplink position signal carrying an identifier of the UE to the network side in accordance with the determined configuration information in the case that a predetermined triggering condition has been met.

In a fifth implementation based on the fourth implementation of the first aspect, the predetermined triggering condition includes at least one of following conditions: a location area where the UE is located has been changed; a frequency point used by the UE has been changed; a cell where the UE is located is of a predetermined type; and the UE has received a reporting instruction from the network side.

In a sixth implementation based on any one of the first implementation of the first aspect to the fifth implementation of the first aspect or the first aspect, transmitting by the UE the uplink position signal carrying the identifier of the UE to the network side in accordance with the determined configuration information includes: transmitting, by the UE, the uplink position signal carrying the identifier of the UE that has been encrypted to the network side in accordance with the determined configuration information.

In second aspect, the present disclosure provides in some embodiments an addressing method, including: receiving, by an access node, an uplink position signal carrying an identifier of a UE; and reporting, by the access node, the identifier of the UE and first addressing information for the UE to an upper-layer network node, so as to enable the upper-layer network node to address the UE in accordance with the identifier of the UE and the first addressing information for the UE in the case that it is necessary for the upper-layer network node to address the UE.

According to the embodiments of the present disclosure, the access node receives the uplink position signal carrying the identifier of the UE and determines the addressing information of the UE in accordance with the identifier of the UE. In the case that it is necessary for the upper-layer network node to address the UE, the upper-layer network node may address the UE in accordance with the identifier of the UE and the determined addressing information of the UE. In this way, it is unnecessary for the UE to identify a cell, and thus it is able to address the UE that uses services provided by a virtualized UDN.

In a first implementation based on the second aspect, subsequent to receive by the access node the uplink position signal carrying the identifier of the UE, and prior to report by the access node the identifier of the UE and the first addressing information for the UE to the upper-layer network node, the addressing method further includes: measuring, by the access node, quality of the received uplink position signal; and determining, by the access node, the first addressing information in the case that the measured quality of the received uplink position signal has met a predetermined threshold.

In a second implementation based on the first implementation of the second aspect or the second aspect, determining by the access node the first addressing information includes determining, by the access node, a coverage of the access node and/or an identifier of the access node as the first addressing information.

In a third aspect, the present disclosure provides in some embodiments an addressing method, including: receiving, by a local control node, an identifier of a UE reported by an access node; determining, by the local control node, second addressing information in accordance with the received identifier of the UE; and reporting, by the local control node, the determined second addressing information to a core network controller, so as to enable the core network controller to address the UE in accordance with the second addressing information in the case that it is necessary to address the UE.

According to the embodiments of the present disclosure, the local control node receives the identifier of the UE, determine the second addressing information in accordance with the received identifier of the UE, and report the determined second addressing information to the core network controller. Then, in the case that it is necessary to address the UE, the core network controller may address the UE in accordance with the second addressing information. In this way, it is unnecessary for the UE to identify a cell, and thus it is able to address the UE using services that are provided by the virtualized UDN.

In a first implementation based on the third aspect, the addressing method further includes receiving, by the local control node, first addressing information reported by the access node. Determining by the local control node the second addressing information in accordance with the received identifier of the UE includes: determining, by the local control node, an identifier of the local control node and the received identifier of the UE as the second addressing information; or determining, by the local control node, the identifier of the local control node, the received identifier of the UE and the first addressing information for the UE as the second addressing information.

In a second implementation based on the first implementation of the third aspect, prior to determine by the local control node the identifier of the local control node and the received identifier of the UE as the second addressing information, the addressing method further includes, in the case that the received identifier of the UE has been encrypted, decrypting, by the local control node, the encrypted identifier of the UE in accordance with decryption configuration information so as to acquire the identifier of the UE.

In a third implementation based on the first implementation of the third aspect, subsequent to determine by the local control node the identifier of the local control node and the identifier of the UE as the second addressing information, the addressing method further includes: binding, by the local control node, the received identifier of the UE and the first addressing information for the UE to each other.

In a fourth implementation based on the third implementation of the third aspect, subsequent to report by the local control node the determined second addressing information to the core network controller, the addressing method further includes: receiving, by the local control node, an addressing indicator including the identifier of the UE issued by the core network controller; determining, by the local control node, the first addressing information for the UE corresponding to the received identifier of the UE in accordance with the identifier of the UE and the first addressing information for the UE which have been bound to each other; and determining, by the local control node, a corresponding access node in accordance with the determined first addressing information, and issuing the addressing indicator including the received identifier of the UE to the determined access node, so as to enable the access node to issue a paging message or downlink data in accordance with the addressing indicator including the received identifier of the UE.

In a fifth implementation based on the fourth implementation of the third aspect, subsequent to receive by the local control node the addressing indicator including the identifier of the UE issued by the core network controller, and prior to determine by the local control node the first addressing information for the UE corresponding to the received identifier of the UE in accordance with the identifier of the UE and the first addressing information for the UE which have been bound to each other, the addressing method further includes, in the case that the received identifier of the UE has been encrypted, decrypting, by the local control node, the encrypted identifier of the UE in accordance with decryption configuration information of the local control node so as to acquire the identifier of the UE.

In a sixth implementation based on the first implementation of the third aspect, subsequent to report by the local control node the determined second addressing information to the core network controller, the addressing method further includes: receiving, by the local control node, an addressing indicator including the identifier of the UE and an identifier of an access node issued by the core network controller; and issuing, by the local control node, the addressing indicator including the received identifier of the UE to the access node corresponding to the identifier of the access node, so as to enable the access node to issue a paging message or downlink data in accordance with the addressing indicator including the received identifier of the UE.

In a fourth aspect, the present disclosure provides in some embodiments an addressing method, including: determining, by a core network controller, an identifier of a UE which needs to be addressed; determining, by the core network controller, a local control node to which the UE belongs in accordance with second addressing information received from the local control node; and issuing, by the core network controller, an addressing indicator including the identifier of the UE to the determined local control node, so as to enable the local control node to address the UE in accordance with the received identifier of the UE.

According to the embodiments of the present disclosure, the core network controller determines the local control node to which the UE belongs in accordance with the second addressing information received from the local control node, and issue the addressing indicator including the identifier of the UE to the determined local control node, so as to enable the local control node to address the UE in accordance with the received identifier of the UE. In this way, it is unnecessary for the UE to identify a cell, and thus it is able to address the UE using services that are provided by the virtualized UDN.

In a first implementation based on the fourth aspect, the second addressing information includes the identifier of the UE and an identifier of the local control node. Prior to determine by the core network controller the identifier of the UE which needs to be addressed, the addressing method further includes binding, by the core network controller, the received identifier of the UE and the identifier of the local control node to each other. Determine by the core network controller the local control node to which the UE belongs in accordance with the second addressing information received from the local control node includes: determining, by the core network controller, the identifier of the local control node corresponding to the identifier of the UE which needs to be addressed in accordance with the identifier of the UE and the identifier of the local control node which have been bound to each other, and determining, by the core network controller, the local control node to which the UE belongs in accordance with the determined identifier of the local control node.

In a second implementation based on the fourth aspect, the second addressing information includes the identifier of the UE, an identifier of a local control node, and an identifier of an access node. Prior to determine by the core network controller the identifier of the UE which needs to be addressed, the addressing method further includes binding, by the core network controller, the received identifier of the UE, the received identifier of the local control node and the received identifier of the access node to each other. Determine by the core network controller the local control node to which the UE belongs in accordance with the second addressing information received from the local control node includes determining, by the core network controller, the identifier of the local control node and the identifier of the access node corresponding to the identifier of the UE which needs to be addressed in accordance with the identifier of the UE, the identifier of the local control node and the identifier of the access node which have been bound to each other, and determining, by the core network controller, the local control node to which the UE belongs in accordance with the determined identifier of the local control node. Issuing by the core network controller the identifier of the UE to the determined local control node includes issuing, by the core network controller, an addressing indicator including the identifier of the UE and the determined identifier of the access node to the determined local control node.

In a fifth aspect, the present disclosure provides in some embodiments a UE, including: a determination unit configured to determine configuration information of an uplink position signal; and a transmission unit configured to transmit the uplink position signal carrying an identifier of the UE to a network side in accordance with the determined configuration information, so as to enable the network side to determine addressing information of the UE in accordance with the identifier of the UE, and address the UE in accordance with the identifier and the addressing information of the UE in the case that it is necessary to address the UE.

According to the embodiments of the present disclosure, the identifier of the UE is carried in the determined uplink position signal and reported to the network side. The network side may determine the addressing information of the UE in accordance with the identifier of the UE and, in the case that it is necessary to address the UE, the network side may address the UE in accordance with the identifier and the addressing information of the UE. In this way, it is unnecessary for the UE to identify a cell, and thus it is able to address the UE that uses services provided by a virtualized UDN.

In a first implementation based on the fifth aspect, the determination unit is further configured to receive the configuration information of the uplink position signal issued by the network side, or interact with the network side to determine the configuration information of the uplink position signal.

In a second implementation based on the fifth aspect, the UE further includes an enabling unit configured to, before the transmission unit transmits the uplink position signal carrying an identifier of the UE to the network side in accordance with the determined configuration information, enable a function of transmitting the uplink position signal in accordance with a signaling received from the network side after it has determined that the function of transmitting the uplink position signal needs to be enabled.

In a third implementation based on the second implementation of the fifth aspect, the enabling unit is further configured to determine that the function of transmitting the uplink position signal needs to be enabled after it has received a predetermined common signaling or a signaling instructing the UE to enable the function of transmitting the uplink position signal.

In a fourth implementation based on the fifth aspect, the transmission unit is further configured to periodically transmit the uplink position signal carrying an identifier of the UE to the network side in accordance with the determined configuration information; or transmit the uplink position signal carrying an identifier of the UE to the network side in accordance with the determined configuration information in the case that a predetermined triggering condition has been met.

In a sixth implementation based on the fourth implementation of the fifth aspect, the predetermined triggering condition includes at least one of following conditions: a location area where the UE is located has been changed; a frequency point used by the UE has been changed; a cell where the UE is located is of a predetermined type; and the UE has received a reporting instruction from the network side.

In a sixth implementation based on any one of the first to the fifth implementations of the fifth aspect or the fifth aspect, the transmission unit is further configured to transmit the uplink position signal carrying the identifier of the UE that has been encrypted to the network side in accordance with the determined configuration information.

In a sixth aspect, the present disclosure provides in some embodiments an access node, including: a reception unit configured to receive an uplink position signal carrying an identifier of a UE; and a reporting unit configured to report the identifier of the UE and first addressing information for the UE to an upper-layer network node, so as to enable the upper-layer network node to address the UE in accordance with the identifier of the UE and the first addressing information for the UE in the case that it is necessary to address the UE.

According to the embodiments of the present disclosure, the access node receives the uplink position signal carrying the identifier of the UE and determines the addressing information of the UE in accordance with the identifier of the UE. In the case that it is necessary to address the UE, the upper-layer network node may address the UE in accordance with the identifier of the UE and the determined addressing information of the UE. In this way, it is unnecessary for the UE to identify a cell, and thus it is able to address the UE that uses services provided by a virtualized UDN.

In a first implementation based on the sixth aspect, the access node further includes a measurement unit configured to measure quality of the received uplink position signal after the reception unit has received the uplink position signal carrying the identifier of the UE and before the reporting unit has reported the identifier of the UE and the first addressing information for the UE to the upper-layer network node. The reporting unit is further configured to determine the first addressing information in the case that the measured quality of the received uplink position signal has met a predetermined threshold.

In a second implementation based on the sixth aspect or the first implementation of the sixth aspect, the reporting unit is further configured to determine a coverage of the access node and/or an identifier of the access node as the first addressing information.

In a seventh aspect, the present disclosure provides in some embodiments a local control node, including: a first reception unit configured to receive an identifier of a UE reported by an access node; a first determination unit configured to determine second addressing information in accordance with the received identifier of the UE; and a reporting unit configured to report the determined second addressing information to a core network controller, so as to enable the core network controller to address the UE in accordance with the second addressing information in the case that it is necessary to address the UE.

According to the embodiments of the present disclosure, the local control node receives the identifier of the UE, determines the second addressing information in accordance with the received identifier of the UE and the first addressing information for the UE, and reports the determined second addressing information to the core network controller. Then, in the case that it is necessary to address the UE, the core network controller may address the UE in accordance with the second addressing information. In this way, it is unnecessary for the UE to identify a cell, and thus it is able to address the UE using services that are provided by the virtualized UDN.

In a first implementation based on the seventh aspect, the first reception unit is further configured to receive first addressing information reported by the access node. The first determination unit is further configured to determine an identifier of the local control node and the received identifier of the UE as the second addressing information, or determine the identifier of the local control node, the received identifier of the UE and the first addressing information for the UE as the second addressing information.

In a second implementation based on the first implementation of the seventh aspect, the local control node further comprises: a first decryption unit configured to, before the first determination unit determines an identifier of the local control node and the received identifier of the UE as the second addressing information, in the case that the identifier of the UE received by the first reception unit has been encrypted, decrypt the encrypted identifier of the UE in accordance with decryption configuration information to acquire the identifier of the UE.

In a third implementation based on the first implementation of the seventh aspect, the local control node further includes: a binding unit configured to, after the first determination units has determined an identifier of the local control node and the received identifier of the UE as the second addressing information, bind the received identifier of the UE and the first addressing information for the UE to each other.

In a fourth implementation based on the third implementation of the seventh aspect, the local control node further includes: a second reception unit configured to, after the reporting unit has reported the determined second addressing information to the core network controller, receive an addressing indicator including the identifier of the UE issued by the core network controller; a second determination unit configured to determine the first addressing information for the UE corresponding to the received identifier of the UE in accordance with the identifier of the UE and the first addressing information for the UE which have been bound to each other; a third determination unit configured to determine a corresponding access node in accordance with the determined first addressing information; and a first issuing unit configured to issue the addressing indicator including the received identifier of the UE to the access node determined by the third determination unit, so as to enable the access node to issue a paging message or downlink data in accordance with the addressing indicator including the received identifier of the UE.

In a fifth implementation based on the fourth implementation of the seventh aspect, the local control node further includes a second decryption unit configured to, after the second reception unit has received the addressing indicator including the identifier of the UE issued by the core network controller and before the second determination unit has determined the first addressing information for the UE corresponding to the received identifier of the UE in accordance with the identifier of the UE and the first addressing information for the UE which have been bound to each other, in the case that the received identifier of the UE has been encrypted, decrypt the encrypted identifier of the UE in accordance with the decryption configuration information so as to acquire the identifier of the UE.

In a sixth implementation based on the first implementation of the seventh aspect, the local control node further includes: a third reception unit configured to, after the reporting unit has reported the determined second addressing information to the core network controller, receive an addressing indicator including the identifier of the UE and an identifier of an access node issued by the core network controller; and a second issuing unit configured to issue the addressing indicator including the received identifier of the UE to the access node corresponding to the identifier of the access node, so as to enable the access node to issue a paging message or downlink data in accordance with the addressing indicator including the received identifier of the UE.

In an eighth aspect, the present disclosure provides in some embodiments a core network controller, including: a first determination unit configured to determine an identifier of a UE which needs to be addressed; a second determination unit configured to determine a local control node to which the UE belongs in accordance with second addressing information received from the local control node; and an issuing unit configured to issue an addressing indicator including the identifier of the UE to the determined local control node, so as to enable the local control node to address the UE in accordance with the received identifier of the UE.

According to the embodiments of the present disclosure, the core network controller determines the local control node to which the UE belongs in accordance with the second addressing information received from the local control node, and issue the addressing indicator including the identifier of the UE to the determined local control node, so as to enable the local control node to address the UE in accordance with the received identifier of the UE. In this way, it is unnecessary for the UE to identify a cell, and thus it is able to address the UE using services that are provided by the virtualized UDN.

In a first implementation based on the eighth aspect, the second addressing information includes the identifier of the UE and an identifier of the local control node. The core network controller further includes a first binding unit configured to, before the first determination unit has determined the identifier of the UE which needs to be addressed, bind the received identifier of the UE and the identifier of the local control node to each other. The second determination unit is further configured to determine the identifier of the local control node corresponding to the identifier of the UE which needs to be addressed in accordance with the identifier of the UE and the identifier of the local control node which have been bound to each other by the binding unit, and determine the local control node to which the UE belongs in accordance with the determined identifier of the local control node.

In a second implementation based on the eighth aspect, the second addressing information includes the identifier of the UE, an identifier of the local control node and an identifier of an access node. The core network controller further includes a second binding unit configured to, before the first determination unit has determined the identifier of the UE which needs to be addressed, bind the received identifier of the UE, the received identifier of the local control node and the received identifier of the access node to each other. The second determination unit is further configured to determine the identifier of the local control node and the identifier of the access node corresponding to the identifier of the UE which needs to be addressed in accordance with the identifier of the UE, the identifier of the local control node and the identifier of the access node which have been bound to each other by the binding unit, and determine the local control node to which the UE belongs in accordance with the determined identifier of the local control node. The issuing unit is further configured to issue an addressing indicator including the identifier of the UE and the determined identifier of the access node to the determined local control node.

DETAILED DESCRIPTION OF THE EMBODIMENTS

According to the embodiments of the present disclosure, a UE may determine configuration information of an uplink position signal, and transmit the uplink position signal carrying an identifier of the UE to a network side (e.g., an access node) in accordance with the determined configuration information. The access node may report the received identifier of the UE and first addressing information for the UE to an upper-layer network node (e.g., a local control node). The local control node may determine second addressing information in accordance with the received identifier of the UE, and report the determined second addressing information to a core network controller. After determining the identifier of the UE which needs to be addressed, the core network controller may determine the local control node to which the UE belongs in accordance with the received second addressing information from the local control node, and issue an addressing indicator including the identifier of the UE to the determined local control node, so as to enable the local control node to address the UE in accordance with the received identifier of the UE. Because the UE reports its own identifier carried in the determined uplink position signal to the network side, the network side may determine the addressing information of the UE in accordance with the identifier of the UE, and in the case that it is necessary to address the UE, the network side may address the UE in accordance with the identifier of the UE and the determined addressing information of the UE. In this way, it is unnecessary for the UE to identify a cell, and thus it is able to address the UE using services provided by a virtualized UDN.

The present disclosure will be described hereinafter in conjunction with the drawings and the embodiments. It should be appreciated that, the following embodiments are merely for illustrative purposes, but shall not be used to limit the scope of the present disclosure. These embodiments and the features therein may be combined in any way in the case of no conflict.

The following descriptions will be given on the basis of a UE side and a network side (including an access node, a local control node and a core network controller) respectively.

Figure 1:
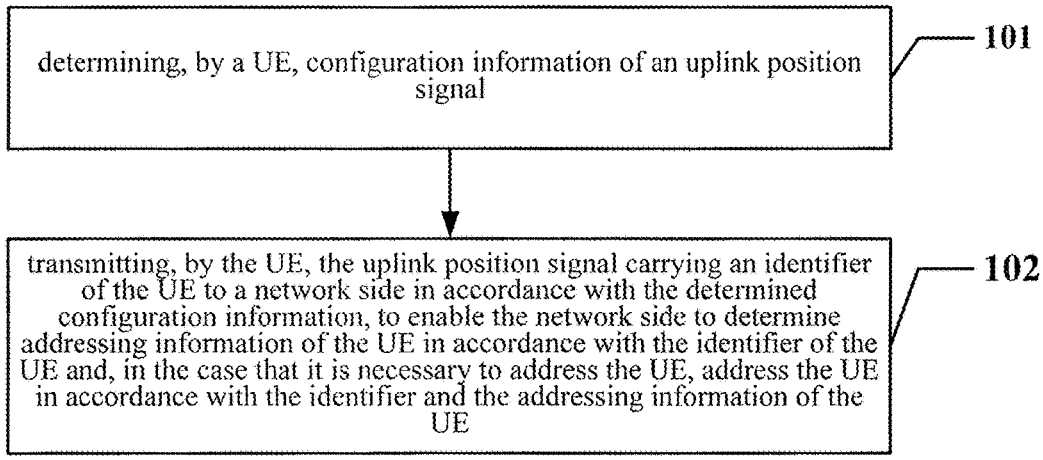
FIG. 1 is a flow chart of an addressing method at a user side according to one embodiment of the present disclosure.

Referring to FIG. 1, the present disclosure provides in some embodiments an addressing method at a user side, which includes the following steps.

Step 101: determining, by a UE, configuration information of an uplink position signal.

To be specific, the configuration information mainly includes at least one of the following six categories of information:

a first category of information: a resource configuration for the transmission of the uplink position signal, which may include a time-frequency resource position, a repetition period and a repetitive pattern and the like;

a second category of information: a power configuration for the transmission of the uplink position signal, which may include maximum permissible power, a power climbing parameter and the like;

a third category of information: a physical-layer configuration for the transmission of the uplink position signal, e.g., a modulation mode and an encoding format;

a fourth category of information: a period configuration for the transmission of the uplink position signal, which may include a minimum and maximum permissible periods, a list of permissible periods and the like;

a fifth category of information: a feedback configuration, e.g., whether or not there is a feedback message and where is the feedback message; and a sixth category of information: some additional configurations for preventing the occurrence of collision and improving a reception success rate, e.g., a mode for randomly selecting a resource (e.g., randomly selecting the resource among the N resources recently received), the maximum retransmission times, and a policy for the retransmission.

Step 102: transmitting, by the UE, the uplink position signal carrying an identifier of the UE to a network side in accordance with the determined configuration information, so as to enable the network side to determine addressing information of the UE in accordance with the identifier of the UE, and address the UE in accordance with the identifier and the addressing information of the UE in the case that it is necessary to address the UE.

It should be appreciated that, the UE may also carry additional information other than the identifier of the UE in the uplink position signal, which will not be particularly defined herein. In the embodiments of the present disclosure, the uplink position signal carrying the identifier of the UE is used to enable the network side to identify the UE, enable the network side to determine the addressing information of the UE according with the identifier of the UE, and to enable the network side to address the UE in accordance with the identifier and the addressing information of the UE in the case that it is necessary to address the UE.

In a possible embodiment of the present disclosure, in order to ensure the security of the identifier of the UE on a transmission path, in Step 102, the UE may transmit the uplink position signal carrying the identifier of the UE that has been encrypted to the network side in accordance with the determined configuration information.

It should be appreciated that, the addressing information in Step 102 mainly refers to a data transmission path, which may be a specific path of the UE, i.e., a downlink path to the UE along which downlink data is transmitted, or a complete path from an air-interface serving node to all serving nodes of a core network.

In a possible embodiment of the present disclosure, the UE may determine the configuration information of the uplink position signal ill one of the following modes. In Mode 1, the UE may receive the configuration information of the uplink position signal issued by the network side. In Mode 2, the UE may interact with the network side to determine the configuration information of the uplink position signal.

In a possible embodiment of the present disclosure, prior to transmit by the UE the uplink position signal carrying an identifier of the UE to the network side ill accordance with the determined configuration information, the addressing method further includes: enabling, by the UE, a function of transmitting the uplink position signal in accordance with a signaling received from the network side after it has determined that the function of transmitting the uplink position signal needs to be enabled.

The reason for the UE to enable the function of transmitting the uplink position signal in accordance with a signaling received from the network side after it has determined that the function of transmitting the uplink position signal needs to be enabled will be given hereinafter.

A network may be upgraded or updated step by step, and a conventional network (i.e., an existing network where the UE is addressed through the identifier of the cell) and an UDN (also called as a novel network) may coexist for a long period of time. Hence, in an entire network system, the UEs (also called as novel UEs) that use services provided by the UDN may also coexist with the UEs that use services provided by the conventional network for a long period of time.

For each UE, even the novel UE, it must support a conventional position updating process and an uplink position signal transmission mode in the novel network. When and which mode needs to be selected completely depend on a display configuration at the network side. For example, for a conventional base station or frequency point, conventional broadcast information is transmitted, so after reading the broadcast information, the UE may understand that a cell where it resides currently is a conventional cell, and at this time, the UE may perform the conventional position updating process (e.g., Tracking Area Update (TAU)). However, in the case that the UE resides in a novel cell or frequency point, it is impossible for the UE to read the conventional broadcast information. At this time, after the UE has determined that the function of transmitting the uplink position signal needs to be enabled, the UE may enable this function in accordance with the signaling from the network side.

In a possible embodiment of the present disclosure, the UE may determine that the function of transmitting the uplink position signal needs to be enabled after it has received predetermined common signaling or signaling instructing the UE to enable the function of transmitting the uplink position signal.

To be specific, the predetermined common signaling received by the UE may be common signaling carried at the network side and implicitly indicating that the function of transmitting the uplink position signal needs to be enabled and the uplink position signal needs to be transmitted. For example, the UE may receive a resource configuration of the uplink position signal (this information does not exist in a conventional cell), and at this time, the UE may be determined that the function of transmitting the uplink position signal has been enabled in the cell where the UE resides. Also, the signaling indicating the UE to enable the function of transmitting the uplink position signal and received by the UE may be an explicit indicator, i.e., it may be a display signaling that is used to indicate the UE to enable the function of transmitting the uplink position signal.

After the UE has correctly resided in the novel cell that supports the transmission of the uplink position signal and the function of transmitting the uplink position signal has been enabled, the UE needs to read the configuration information of the uplink position signal, so as to start the transmission of the uplink position signal.

In a possible embodiment of the present disclosure, the UE may transmit the uplink position signal carrying an identifier of the UE to the network side in accordance with the determined configuration information in either of the following two modes: (1) periodically transmitting, by the UE, the uplink position signal carrying an identifier of the UE to the network side in accordance with the determined configuration information; or (2) transmitting, by the UE, the uplink position signal carrying an identifier of the UE to the network side in accordance with the determined configuration information in the case that a predetermined triggering condition has been met.

In a possible embodiment of the present disclosure, the predetermined triggering condition may include at least one of following conditions: a location area where the UE is located has been changed; a frequency point used by the UE has been changed; a cell where the UE is located is of a predetermined type; and the UE has received a reporting instruction from the network side.

The above Modes (1) and (2) will be described hereinafter.

In the Mode (1), as a feasible way, the uplink position signal may be transmitted periodically. For the UE that resides in a novel cell/frequency point, it may transmit the uplink position signal in accordance with the configuration information at the network side, mainly a transmission period configuration, e.g., minimum/maximum period limit and a list of available periods. The minimum period limit is mainly used to prevent the uplink position signal from being transmitted frequently by the UE, thereby to save resources and prevent the UE from interfering with the others. The list of available periods is used to further manage the periods of the UE for transmitting the uplink position signal at the network side, and the UE may merely select one of these periods as its own transmission period.

For the UE, how to select the transmission period for the uplink position signal mainly depends on its own state and its implementation algorithm. Generally speaking, in the case that the UE is of sufficient electricity and the time delay is highly demanded, a shorter period may be selected for the transmission of the uplink position signal, and in the case that the UE is of insufficient electricity or in an energy-saving state or the time delay is not highly demanded, a longer period may be selected for the transmission of the uplink position signal.

The uplink position signal may be periodically transmitted by the UE in the following steps.

Step A0: the UE acquires a requisite configuration of the uplink position signal from the network side, e.g., license information for transmitting the uplink position signal, a time-frequency resource position/repetition period/repetitive pattern for transmitting the uplink position signal, a transmission configuration such as power and physical format, a period configuration and any other configurations, and selects its own transmission parameter within a permissible range in accordance with the configurations from the network side and its own algorithm.

Step A1: in the case that a condition for periodically transmitting the uplink position signal has been met for the first time (usually in the case that the UE moves into, for the first time or the second time, the coverage of a novel cell where the transmission of the uplink position signal is permitted, or in the case that another condition has been met, e.g., in the case that the parameter has been reconfigured at the network side or the UE is required by a network display signaling to transmit the uplink position signal), in order to increase the transmission success rate and reduce the probability of collision as possible, usually the UE may randomly select one resource from the latest N resources so as to transmit the uplink position signal. Also, the UE may select the resource in accordance with a rule prescribed or predetermined at the network side, e.g., the identifier of the UE. In a simplest way, the resource for each UE may be selected in accordance with group information of identifications (IDs) of the UEs, e.g., the resources at odd-numbered subframes may be selected for the UEs with the odd-numbered IDs, and the resources at even-numbered subframes may be selected for the UEs with the even-numbered IDs.

Step A2: the UE decides a next operation in accordance with a feedback message from the network side and the repetition configuration.

In the case that a feedback message is configured, the UE needs to monitor any possible feedback message at a corresponding feedback position. The feedback message may be sent by a plurality of access nodes, but the signals from these access nodes must be identical to each other, so that the UE can receive them in a combined manner.

In the case that the UE has received an acknowledgement (ACK) message, it is deemed that its uplink position signal has been received correctly by the network node, i.e., the uplink position signal has been transmitted successfully by the UE within a current period, and subsequently the UE may wait for the next period. In the case that the UE fails to receive any feedback message or it has merely received a negative acknowledgement (NACK) message at the prescribed feedback position, it may prepare for the transmission of the uplink position signal again in accordance with the repetition configuration at the network side. Generally speaking, within each period, the total times for repeatedly transmitting the uplink position signal and the parameters for subsequently transmitting the uplink position signal (e.g., a power climbing parameter and an anti-collision parameter) may be prescribed at the network side. For example, a certain rollback factor may be provided, and the UE may be in a silent state randomly for a certain time period and then transmit the uplink position signal again. In the case that no feedback mechanism is configured at the network side, generally speaking, the UE also needs to repeatedly transmit the uplink position signal within one period, so as to increase the transmission success rate and prevent the occurrence of collision. The retransmission parameters, e.g., the total times for the repeated transmission of the uplink position signal within one period, the parameter for the subsequent transmission of the uplink position signal (e.g., the power climbing parameter and the anti-collision parameter) and the rollback factor, may be configured at the network side, so that the UE may be in a silent state randomly for a certain time period and then transmit the uplink position signal again.

Step A3: after the uplink position signal has been successfully transmitted by the UE within one period, the UE may wait for transmitting the uplink position signal within a next period again. Steps A1 to A3 may be substantially repeated, until the transmission of the uplink position signal by the UE is prohibited (e.g., in the case that the UE moves out of the coverage of a novel cell/frequency point, or a cell/frequency point that does not support uplink position signal is reselected by the UE, or the functional of transmitting the uplink position signal has been currently disabled at the network side).

In Mode 2, as another feasible way, the transmission of the uplink position signal may be triggered at the UE only in the case that a certain triggering condition has been met.

The triggering condition for the UE to transmit the uplink position signal mainly includes the change of the region where the UE is currently located. For example, in the case that the UE reselects region 2 stead of region 1, the transmission of the uplink position signal will be triggered. However, in the case that the reselection is performed by the UE between different cells or frequency points at an identical region, the transmission of the uplink position signal will not be triggered. The region may be defined at the network side, and region information about each cell or frequency point may be notified through a common signaling. In the case that region information about a reselected cell read by the UE is different from the region information about a cell where the UE previously resided, it may determine that the region has been changed, and thus it may transmit the uplink position signal. In addition, the transmission of the uplink position signal may also be triggered in any other ways. For example, in the case that a new frequency point is reselected by the UE or the UE enters a cell of a predetermined type, e.g., a Closed Subscriber Group (CSG) cell or an indoor high-frequency/hotspot cell, the transmission of the uplink position signal may also be triggered once. In a word, how to transmit the uplink position signal in a triggered manner is controlled at the network side and depends on such factors as network planning and positioning requirements of the UE. Moreover, each UE may be separately configured with a corresponding triggering mode. For example, before the UE exits a connection state, some parameters dedicated for the UE may be issued to the UE, so as to trigger the transmission of the uplink position signal.

The UE may transmit the uplink position signal in a triggered manner in the following steps.

Step B0: similar to the periodical transmission of the uplink position signal (Step A1 in Mode 1), at first, it is necessary for the UE to acquire all the licenses and configurations for the transmission of the uplink position signal from the network side. Because the uplink position signal does not need to be transmitted periodically, such configurations as the transmission period are not required. However, in order to ensure the transmission success rate to some extent, the repetition times and power climbing parameters also need to be provided.

Step B1: in the case that a triggering condition for the transmission of the uplink position signal has been met, in order to increase the transmission success rate and reduce the probability of collision as possible, usually the UE may randomly select one resource from the latest N resources so as to transmit the uplink position signal. Also, the UE may select the resource in accordance with a rule prescribed or predetermined at the network side, usually the UE may randomly select one resource from the latest N resources so as to transmit the uplink position signal. Also, the UE may select the resource in accordance with a rule prescribed or predetermined at the network side, e.g., the identifier of the UE. In a simplest way, the resource for each UE may be selected in accordance with group information of the IDs of the UEs, e.g., the resources at odd-numbered subframes may be selected for the UEs with the odd-numbered IDs, and the resources at even-numbered subframes may be selected for the UEs with the even-numbered IDs.

Step B2: the UE decides a next operation in accordance with a feedback message from the network side and the repetition configuration. Here, the feedback and repetition mechanism is similar to that mentioned in Mode 1, which is also configured to further improve the transmission success rate, and prevent the failed transmission of the uplink position signal due to collision and link problems.

It should be appreciated that, the main difference between the transmission of the uplink position signal in a triggered manner and the transmission of the uplink position signal periodically lies in that, for the former, it is unnecessary to transmit the uplink position signal any more after the uplink position signal has been transmitted successfully, unless the triggering condition for the transmission of the uplink position signal has been met again.

In addition, in the case that the UE is reselected from a cell which does not support the transmission of the uplink position signal to a cell which supports the transmission of the uplink position signal, usually the UE needs to transmit the uplink position signal immediately, so as to enable the network side to acquire cell information or basic position information about the cell where the UE currently resides. Identically, in the case that the UE is reselected from a cell which supports the transmission of the uplink position signal to a cell which does not support the transmission of the uplink position signal, usually the UE also needs to perform a region updating process (the TAU process), so as to notify the network side of its current position information. Of course, in the case that the UE is provided with a dual-SIM (subscriber identity module) card-dual-standby (DSDS) function and it resides in a novel cell and a conventional cell simultaneously, both the above two processes need to be maintained.

Figure 2:
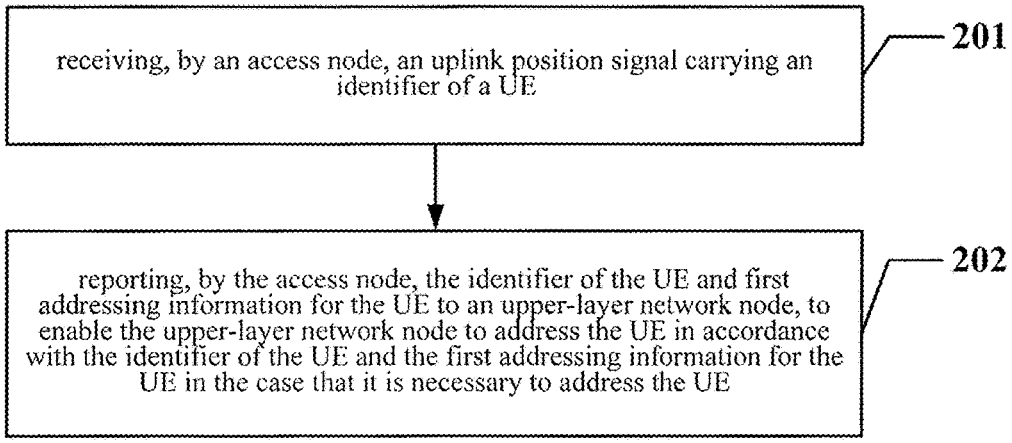
FIG. 2 is a flow chart of an addressing method for an access node at a network side according to one embodiment of the present disclosure.

Referring to FIG. 2, the present disclosure provides in some embodiments an addressing method for an access node at the network side, which includes: Step 201 of receiving, by the access node, an uplink position signal carrying an identifier of a UE; and Step 202 of reporting, by the access node, the identifier of the UE and first addressing information for the UE to an upper-layer network node, so as to enable the upper-layer network node to address the UE in accordance with the identifier of the UE and the first addressing information for the UE in the case that it is necessary to address the UE.

It should be appreciated that, the first addressing information in Step 202 may merely include an identifier of the access node, i.e., information about an air-interface serving node.

In a possible embodiment of the present disclosure, determining by the access node the first addressing information may include determining, by the access node, a coverage of the access node and/or an identifier of the access node as the first addressing information.

The uplink position signal transmitted by the UE may be received by a plurality of access nodes. Generally speaking, the farther the UE away from the access node, the worse the quality of the uplink position signal received by the access node, and in contrast, the closer the UE to the access node, the better the quality of the uplink position signal received by the access node. Hence, a reception quality threshold may be set so as to determine the first addressing information accurately and reduce the resource consumption of the access node for determining the first addressing information. Optionally, subsequent to receive by the access node the uplink position signal carrying the identifier of the UE, and prior to report by the access node the identifier of the UE and the first addressing information for the UE to the upper-layer network node, the addressing method further includes: measuring, by the access node, quality of the received uplink position signal; and determining, by the access node, the first addressing information in the case that the measured quality of the received uplink position signal has met a predetermined threshold. The received quality may include signal strength, a signal-to-noise ratio and the like.

As mentioned above, the UE may transmit the uplink position signal carrying an identifier of the UE to the network side in accordance with the determined configuration information in any of the above-mentioned Modes 1 and 2. The processings of the access node at the network side will be described hereinafter on the basis of the above two modes.

With respect to Mode 1, the processings of the access node at the network side may include the Steps C0 to C2.

Step C0: the access node may transmit the configuration information (various parameters) of the UE for the transmission of the uplink position signal.

It should be appreciated that, Step C0 is optional. This is because, for the access node, it may take part in or not take part in the transmission of common signaling. In a possible way, the common configuration signaling may be transmitted by a node which is responsible for operations at a control plane and has a large coverage, or parts of, rather than all of, the access nodes may be selected to take part in the transmission of the common signaling. No matter whether the configuration signaling is directly transmitted by the access node, the UE needs to receive the configuration information from the network side. In addition, no matter whether the access node takes part in the transmission of the configuration signaling, each access node which needs to receive the uplink position signal needs to acquire a detailed configuration of the uplink position signal. This process may be completed through the signaling between the network nodes, e.g., the relevant information may be issued to the access node through an upper-layer control node.

Step C1: the access node may monitor the uplink position signal at all positions corresponding to the resources where the uplink position signal may occur. In the case that such information as the identifier of the UE may be parsed correctly (and optionally in the case that a reception quality threshold is set), the access node that meets the reception quality threshold may report the parsed information such as identifier of the UE to the upper-layer control node.

In a possible embodiment of the present disclosure, the reporting process may be further optimized. For example, the identifiers of the UEs within a certain measurement period (e.g., 10 ms) may be grouped into a data packet and transmitted to the upper-layered control node. In the case that the signal of an identical UE has been received repeatedly within a minimum uplink position signal transmission period, it may be considered as the repetitive data and may be reported once. Alternatively, a minimum reporting period may be set, and in the case that the uplink position signal of the UE has been detected repeatedly within the minimum reporting period, it may be reported once.

Step C2: upon the receipt of the uplink position signal of the UE, the access node may return a feedback message to the UE in accordance with a feedback-related configuration in the case that the feedback message needs to be provided.

Usually, the uplink position signal of the UE may be received by a plurality of access nodes. In the case that the uplink position signal has been correctly received by these access nodes, these access nodes may return an ACK message in an identical format to the UE on a same given resource. The UE may receive the signals in a combined manner so as to improve the quality of the signals being received. In the case that the uplink position signal has been received both correctly and erroneously by the access nodes, the access nodes that have received the uplink position signal erroneously may preferably not return an NACK message. This is because a reception effect of the ACK message may be adversely affected by the NACK message different from the ACK message. Usually, in the case that the uplink position signal is not received or the received uplink position signal is not correctly parsed, it is determined that no feedback message needs to be returned by default.

The feedback message may be a one-bit ACK message. In the case of a collision of the UEs, when the signal of one of the UEs has been correctly parsed while the signal of the other UE has not been correctly parsed, the one-bit ACK message may be returned by the network side and received by the two UEs. At this time, the UE whose uplink position signal has not be received correctly may be mistaken for having transmitted the uplink position signal successfully, and the uplink position signal may not be transmitted subsequently, resulting in that the position information of this UE may not be acquired by the access node in time. Optionally, the identifier of the UE may be carried in the feedback message, so as to improve the feedback effect and prevent the occurrence of confusion. However, the more the information carried in the feedback message, the larger the system overhead. Hence, whether or not to carry the identifier of the UE in the feedback message depends on the collision probability and the requirement on the time delay.

With respect to Mode 2, the processings of the access node at the network side are similar to the above-mentioned processings with respect to Mode 1. However, in the case that the uplink position signal is transmitted by the UE periodically, the position of the UE may not be changed but the uplink position signal may be reported by the UE many times in an identical region due to the expiration of the period. At this time, for the purpose of optimization, the access node may filter out the reported uplink position signal, and merely report the changed information, so as to simplify the processing and reduce the signaling overhead. In the case that the uplink position signal is transmitted in a triggered manner (usually the transmission of the uplink position signal is triggered after the region, or the frequency point or the type of the cell where the UE is located has been changed), all the information is valuable and needs to be reported to the access node. Of course, in order to improve the reporting success rate for a single time, the uplink position signal may be transmitted by the UE for many times in an identical cell within a short time period in the case that no feedback message has been received. Usually, this condition may also be identified at the network side. For example, in the case that the transmission interval is very small (e.g., several or dozens of milliseconds) and the region parameters for the UE to transmit the uplink position signal are identical to each other, the reporting process may also be optimized, and meanwhile the uplink position signal may be reported once.

The region parameters refer to those parameters capable of being used to differentiate the cells or regions. For example, region 1 may include several cells, and region 2 may include several other cells. In the case that the region parameters of the UE are identical to each other (e.g., these cells all belong to region 1), it is deemed that the UE does not move for a long distance and it is unnecessary for the UE to report its position information. In other words, granularity for reporting the position information may be region granularity.

It should be appreciated that, the above-mentioned addressing methods at the UE side or for the access node at the network side may be applicable to any UDN architecture including both the UE and the access node, but shall not be limited to specific UDN architecture. The addressing methods and the relevant position updating process will be described hereinafter by taking specific UDN architecture as an example.

Figure 3:
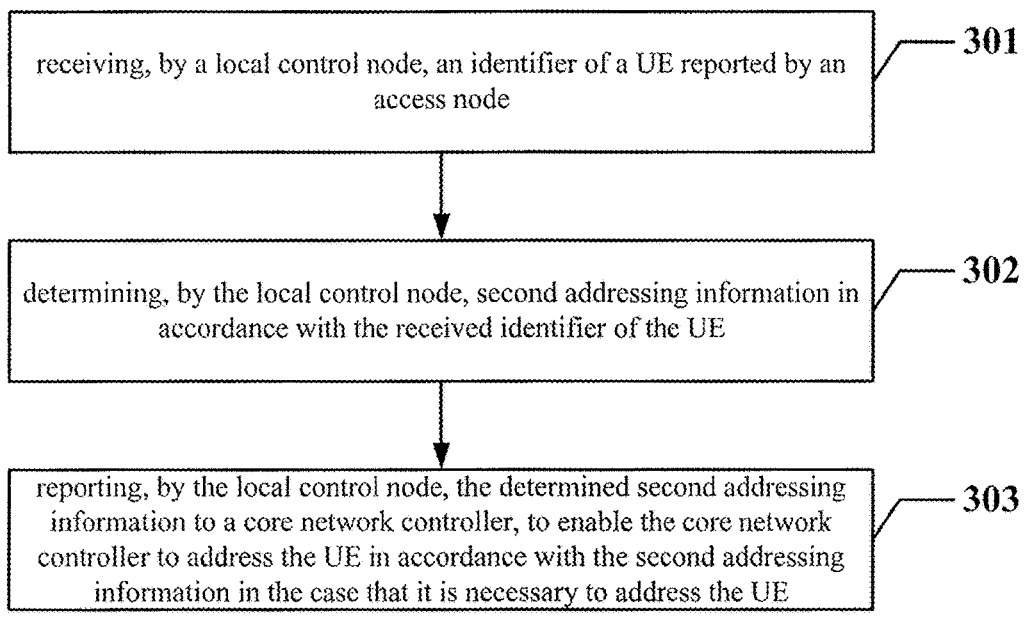
FIG. 3 is a flow chart of an addressing method for a local control node at the network side according to one embodiment of the present disclosure.

Referring to FIG. 3, the present disclosure provides in some embodiments an addressing method for a local control node at the network side, which includes: Step 301 of receiving, by the local control node, an identifier of a UE reported by an access node; Step 302 of determining, by the local control node, second addressing information in accordance with the received identifier of the UE; and Step 303 of reporting, by the local control node, the determined second addressing information to a core network controller, so as to enable the core network controller to address the UE in accordance with the second addressing information in the case that it is necessary to address the UE.

According to the embodiments of the present disclosure, the local control node receives the identifier of the UE, determine the second addressing information in accordance with the received identifier of the UE, and report the determined second addressing information to the core network controller. Then, in the case that it is necessary to address the UE, the core network controller may address the UE in accordance with the second addressing information. In this way, it is unnecessary for the UE to identify a cell, and thus it is able to address the UE using services that are provided by the virtualized UDN.

In some embodiments of the present disclosure, the addressing method for the local control node at the network side may be further optimized. For the security of the identifier of the UE, usually the identifier of the UE to be received by the local control node from the access node may be encrypted, and the identifier of the UE issued by the core network controller may be encrypted too. Two schemes for optimization will be described hereinafter in the case that the identifier of the UE received by the local control node has been encrypted, with respect to FIGS. 4 and 5 respectively.

Figure 4:
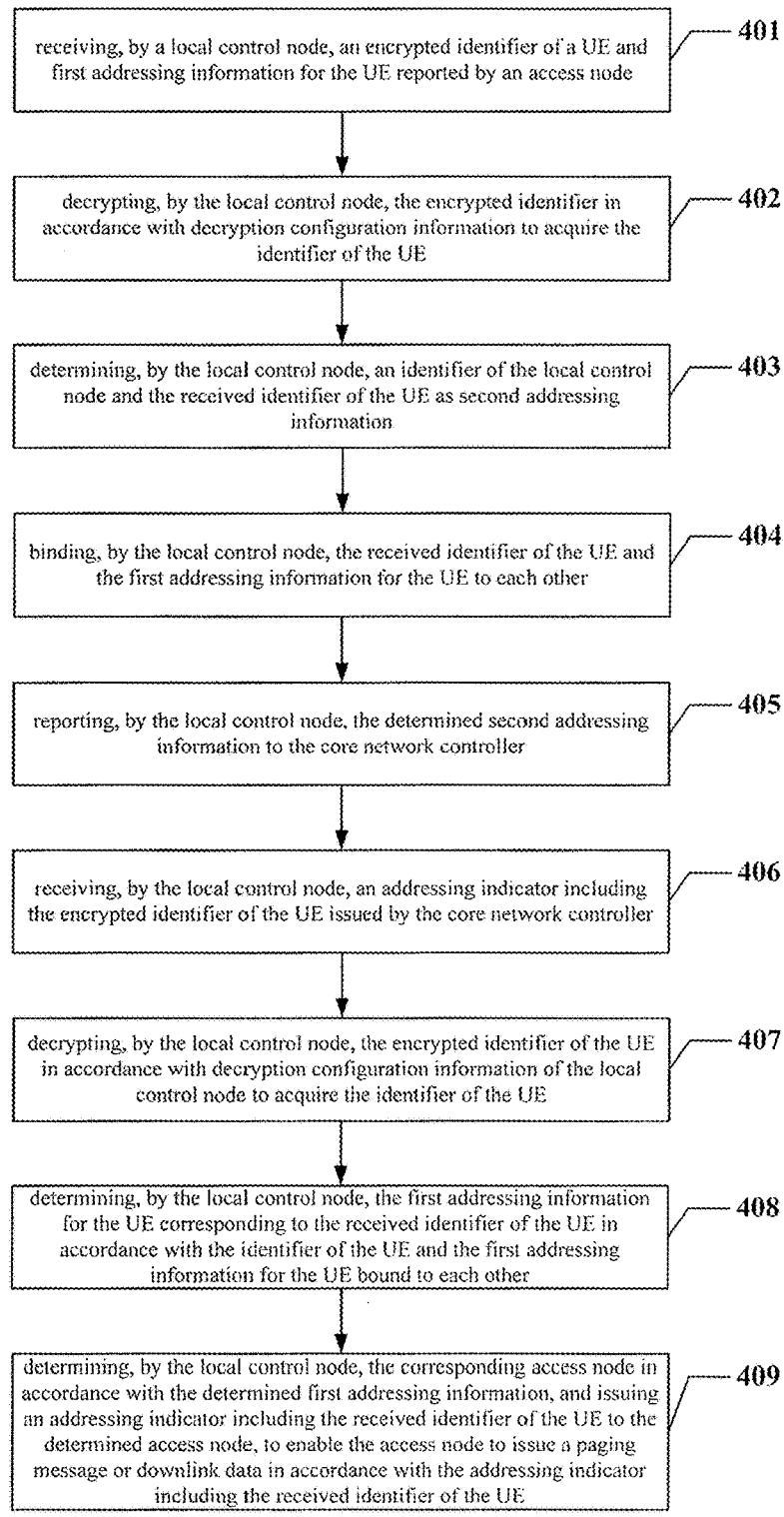
FIG. 4 is another flow chart of the addressing method for the local control node at the network side according to one embodiment of the present disclosure.

For the addressing method as shown in FIG. 4, its basic concept lies in that the local control node may read out the identifier of the UE in an uplink direction (i.e., decrypt the encrypted identifier of the UE), bind the identifier of the UE to the first addressing information for the UE, and then transmit the identifier of the local control node and the identifier of the UE to the core network controller. The core network controller may bind the identifier of the UE to the identifier of the local control node, i.e., the entire addressing information may be stored in two stages (the identifier of the UE may be bound (stored) by both the network controller and the local control node). Correspondingly, in a downlink direction, the local control node may also read of the identifier of the UE, and then the core network controller and the local control node may address the UE in accordance with the respective information bound thereby.

Figure 5:
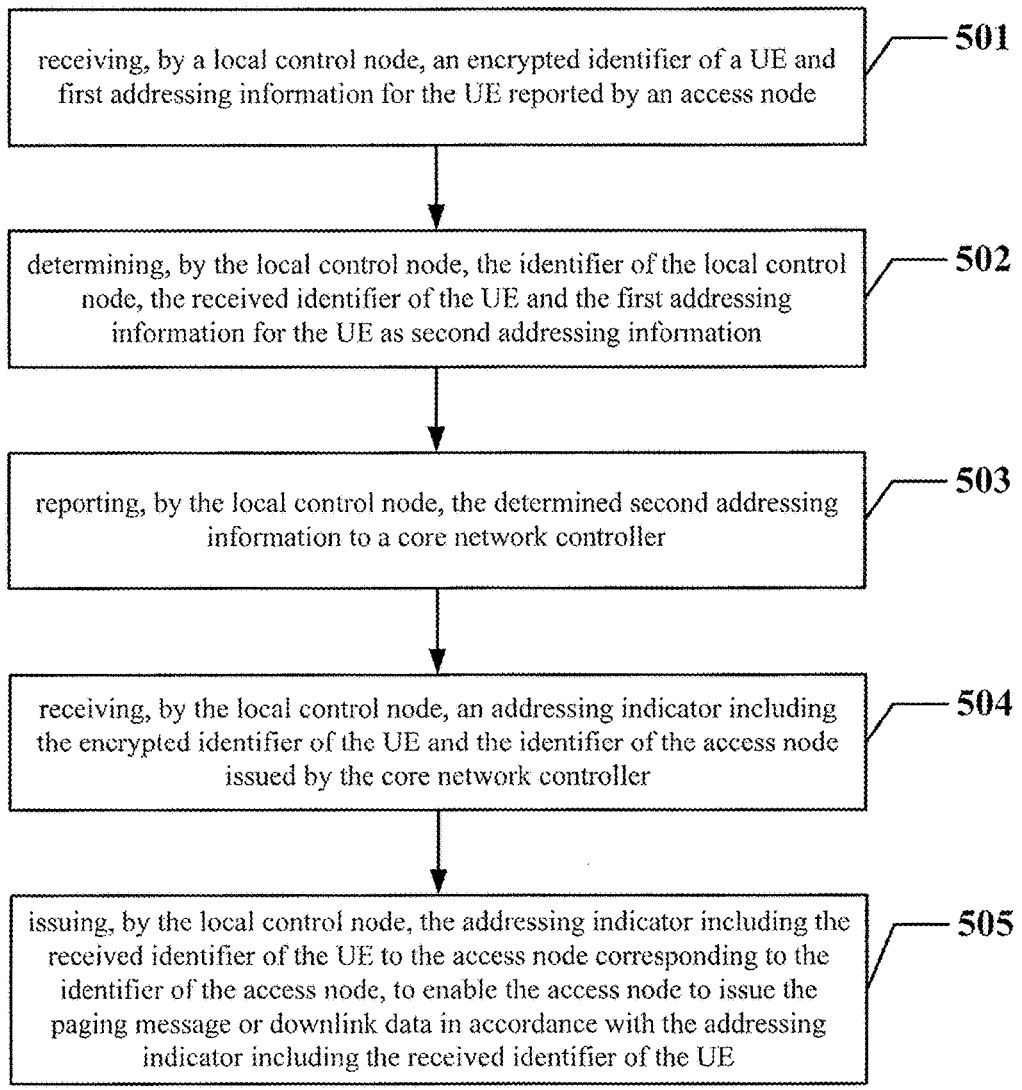
FIG. 5 is yet another flow chart of the addressing method for the local control node at the network side according to one embodiment of the present disclosure.

For the addressing method as shown in FIG. 5, its basic concept lies in that the local control node may not read out the identifier of the UE in the uplink direction (i.e., may not decrypt the encrypted identifier of the UE), so no binding operation may be performed. At this time, the local control node may report its own identifier, the encrypted identifier of the UE and the first addressing information to the core network controller. After the decryption, the core network controller may bind (store) the identifier of the UE, the first addressing information and the identifier of the local control node to each other. Correspondingly, in the downlink direction, after determining the identifier of the UE to be addressed, the core network controller may determine the local control node corresponding to the identifier of the UE to be addressed and the first addressing information in accordance with the information bound thereby, and issue the identifier of the UE and the determined first addressing information to the local control node. The local control node may not decrypt the encrypted identifier of the UE any longer. Instead, it may directly determine the access node in accordance with the first addressing information, and issue the encrypted identifier of the UE to the determined access node. In this way, merely the core network controller is configured to decrypt the encrypted identifier of the UE and acquire the complete addressing information.

Referring to FIG. 4, the present disclosure provides in some embodiments the addressing method for the local control node at the network side, which includes: Step 401 of receiving, by the local control node, the encrypted identifier of the UE and the first addressing information for the UE reported by the access node; Step 402 of decrypting, by the local control node, the encrypted identifier in accordance with decryption configuration information so as to acquire the identifier of the UE; Step 403 of determining, by the local control node, an identifier of the local control node and the received identifier of the UE as second addressing information; Step 404 of binding, by the local control node, the received identifier of the UE and the first addressing information for the UE to each other; and Step 405 of reporting, by the local control node, the determined second addressing information to the core network controller.

Based on the above description, the addressing method including Steps 401 to 405 relates to the uplink direction. The addressing method in the downlink direction will be described in conjunction with the following steps: Step 406 of receiving, by the local control node, an addressing indicator including the encrypted identifier of the UE from the core network controller; Step 407 of decrypting, by the local control node, the encrypted identifier of the UE in accordance with decryption configuration information of the local control node so as to acquire the identifier of the UE; Step 408 of determining, by the local control node, the first addressing information for the UE corresponding to the received identifier of the UE in accordance with the identifier of the UE and the first addressing information for the UE bound to each other; and Step 409 of determining, by the local control node, the corresponding access node in accordance with the determined first addressing information, and issuing the addressing indicator including the received identifier of the UE to the determined access node, so as to enable the access node to issue a paging message or downlink data in accordance with the addressing indicator including the received identifier of the UE.

With reference to FIG. 5, the present disclosure provides in some embodiments the addressing method for the local control node at the network side, which includes: Step 501 of receiving, by the local control node, the encrypted identifier of the UE and the first addressing information for the UE from the access node; Step 502 of determining, by the local control node, the identifier of the local control node, the received identifier of the UE and the first addressing information for the UE as the second addressing information; and Step 503 of reporting, by the local control node, the determined second addressing information to the core network controller.

Based on the above description, the addressing method including Steps 501 to 503 relates to the uplink direction. The addressing method in the downlink direction will be described hereinafter in conjunction with the following steps: Step 504 of receiving, by the local control node, the addressing indicator including the encrypted identifier of the UE and the identifier of the access node issued by the core network controller; and Step 505 of issuing, by the local control node, the addressing indicator including the received identifier of the UE to the access node corresponding to the identifier of the access node, so as to enable the access node to issue the paging message or downlink data in accordance with the addressing indicator including the received identifier of the UE.

It should be appreciated that, the schemes in FIGS. 4 and 5 may also be applicable to the condition where the identifier of the UE received by the local control node is not encrypted. For the scheme in FIG. 4, merely Steps 402 and 407 may be omitted.

Figure 6:
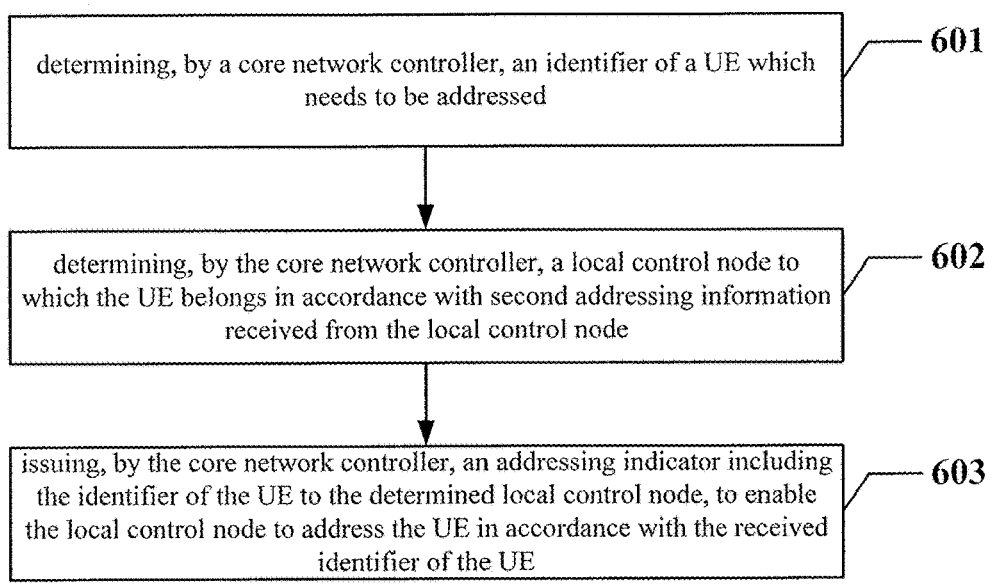
FIG. 6 is a flow chart of an addressing method for a core network controller according to one embodiment of the present disclosure.

Referring to FIG. 6, the present disclosure provides in some embodiments an addressing method for a core network controller, which includes: Step 601 of determining, by the core network controller, an identifier of a UE which needs to be addressed; Step 602 of determining, by the core network controller, a local control node to which the UE belongs in accordance with second addressing information received from the local control node; and Step 603 of issuing, by the core network controller, an addressing indicator including the identifier of the UE to the determined local control node, so as to enable the local control node to address the UE in accordance with the received identifier of the UE.

In a possible embodiment of the present disclosure, prior to the step of issuing, by the core network controller, the addressing indicator including the identifier of the UE to the determined local control node, the addressing method further includes encrypting, by the core network controller, the identifier of the UE.

As mentioned above, there are two optional addressing schemes between the local control node and the core network controller. Correspondingly, there are two optional schemes for the addressing method on the basis of FIG. 6.

Scheme 1

The second addressing information includes the identifier of the UE and an identifier of the local control node. Prior to determine by the core network controller the identifier of the UE which needs to be addressed, the addressing method further includes binding, by the core network controller, the received identifier of the UE and the identifier of the local control node to each other. Determine by the core network controller the local control node to which the UE belongs in accordance with the second addressing information received from the local control node includes: determining, by the core network controller, the identifier of the local control node corresponding to the identifier of the UE which needs to be addressed in accordance with the identifier of the UE and the identifier of the local control node which have been bound to each other, and determining, by the core network controller, the local control node to which the UE belongs in accordance with the determined identifier of the local control node.

Scheme 2

The second addressing information includes the identifier of the UE, an identifier of a local control node, and an identifier of an access node. Prior to determine by the core network controller the identifier of the UE which needs to be addressed, the addressing method further includes binding, by the core network controller, the received identifier of the UE, the received identifier of the local control node and the received identifier of the access node to each other. Determine by the core network controller the local control node to which the UE belongs in accordance with the second addressing information received from the local control node includes: determining, by the core network controller, the identifier of the local control node and the identifier of the access node corresponding to the identifier of the UE which needs to be addressed in accordance with the identifier of the UE, the identifier of the local control node and the identifier of the access node which have been bound to each other, and determining, by the core network controller, the local control node to which the UE belongs in accordance with the determined identifier of the local control node. Issuing by the core network controller the identifier of the UE to the determined local control node includes: issuing, by the core network controller, an addressing indicator including the identifier of the UE and the determined identifier of the access node to the determined local control node.

Figure 7:
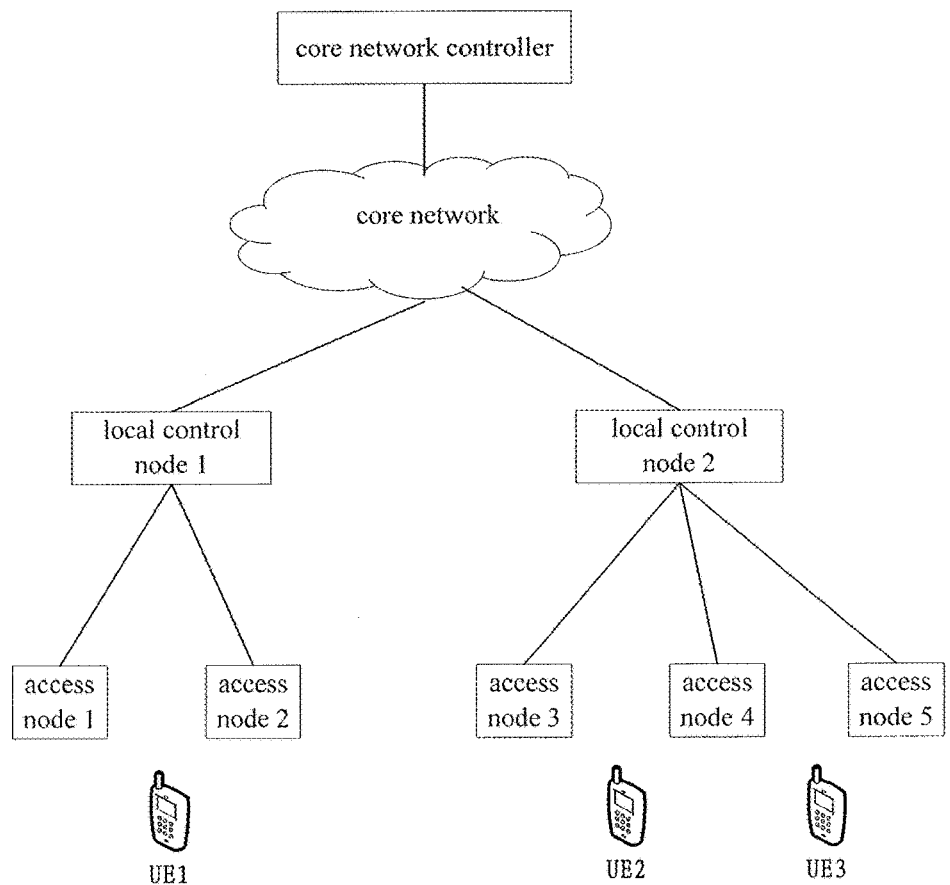
FIG. 7 is schematic view showing feasible network architecture according to one embodiment of the present disclosure.

FIG. 7 is a schematic view showing feasible network architecture according to one embodiment of the present disclosure. Upon the reception of the uplink position signal of the UE, how the region information of the UE is transmitted and managed at the network side will be described hereinafter by taking the network architecture in FIG. 7 as an example.

FIG. 7 shows two-layer network architecture. A macro network controller node is provided at a core network layer, and this logic node functions as to manage the position of the UE and the local control node to which the UE belongs. Of course, in the embodiment of the present disclosure, merely the function of managing the position of the UE and the local control node to which the UE belongs is described. Usually, the core network controller may be provided with more management functions, which will not be particularly defined herein. A local control node is arranged close to the access node, and it is configured to manage the position of the UE and the region to which the UE belongs. Generally speaking, the local control node may further manage, in a centralized manner, a plurality of access stations or function as a mobility anchor point for the UE. In a word, the embodiment of the present disclosure merely focuses on the function of the local control node for managing the position of the UE and the region to which the UE belongs. For example, the network controller at the core network layer may manage the positions of all the China Mobile UEs and the local control nodes to which the UEs belong in Beijing, while the local control node may merely manage the position of the China Mobile UEs and the regions to which the UEs belong in a certain residential area, or a specific business area or even in a certain building in Beijing.

The advantage of the two-layer controllers lies in that the position of the UE and the information about the region to which the UE belongs may be managed and stored at different layers. In other words, the network controller at the core network layer may merely know the current position of the UE and the local control node to which the UE belongs, or may merely manage and store a part of the path for the UE from the core network controller to the local control node. The information about the access node or access nodes to which the UE currently belongs may merely be stored by the local control node, or a path for the UE from the local control node to a possible serving cell may be merely managed or stored by the local control node.

Of course, a region management granularity may be managed and adjusted through network planning. For a coarser region management granularity, a plurality of local control nodes may be grouped into one region. In this way, in the case that the UE moves in the region, the transmission of the uplink position signal may not be triggered, and the information about the position of the UE and the local control nodes to which the UE belongs may be recorded in the core network controller and include a plurality of paths between the UE and the local control nodes. In the case that the UE needs to be called or the downlink addressing operation needs to be performed, it is necessary to transmit the addressing- or paging-related signaling to the plurality of local control nodes. Particularly, within the coverage of one local control node, no detailed paths may be provided, i.e., in the case that the UE moves within the coverage of the access nodes belonging to the local control node, the position information of the UE does not need to be updated. At this time, the local control node merely knows the access node, within the coverage of which the UE may be currently located. In the case that the paging operation is performed by the network, it is necessary to transmit the paging message to all the access nodes belonging to the local control node. Correspondingly, for a finer region management granularity, in the case of determining the current position of the UE and the region to which the UE belongs, one or more access nodes belonging to a certain local control node may be specified accurately. In this way, in the case of the paging operation, it is merely necessary for the network control node of the core network to issue the paging signaling to the specific local control node, and then the specific local control node may transmitting the paging message in the one or more access nodes, so as to determine the position of the UE. At this time, in the finer region management, it is able to reduce the paging overhead, but the region management reporting overhead, the interaction signaling overhead and the complexity may increase. Whether to choose the coarser or finer region management granularity depends on the operator's policy and the implementation.

The information about the position of the UE and the region to which the UE belongs will be recorded through the following steps.

Step D1: the access node may parse the uplink position signal of the UE at a position corresponding to a preconfigured resource.

Step D2: in the case that the identifier of the UE has been parsed correctly, the access node may report the information for the UE to the local control node.

Step D3: in the case that the local control node has received the identifier of the UE from the access node, it means the UE is located within the coverage of the access node. At this time, the information about the position of the UE and/or the region to which the UE belongs (i.e., the first addressing information) may be acquired, i.e., the UE is located adjacent to the access node and/or within the coverage of the access node. The local control node may record the information about the position of the UE and the region to which the UE belongs. For example, in a feasible way, the identifiers of the access nodes which may report the information for the UE may be recorded in the information about the position of the UE and the region to which the UE belongs. In the UDN, information about links between the UE and the plurality of access nodes may meet the quality requirement, so there may exist such a condition where the plurality of access nodes may report the location signal reception signal of the UE to the local control node. For example, in the FIG. 7, for a local control node 1, it may records that the information about the position of UE1 and the region to which UE1 belongs may be associated with an access node 1 and an access node 2; for a local control node 2, it may records that the information about the position of UE2 and the region to which UE2 belongs may be associated with an access node 3 and an access node 4, and the information about the position of UE3 and the region to which UE3 belongs may be associated with the access node 4 and an access node 5.

Step D4: the local control node may report the information about the position of the UE and the region to which the UE belongs to the core network controller. The core network controller may bind the information about the position of the UE and the region to which the UE belongs to the local control node. Of course, it may also bind one UE to a plurality of local control nodes. For the purpose of optimization, prior to report the information about the position of the UE and the region to which the UE belongs to the core network controller, the local control node may check whether or not the information about the region to which the UE belongs was reported previously. In the case that the information about the region to which the UE belongs was reported, a binding relation between the UE and the local control node has been stored in the network controller, and it is unnecessary to report the information about the region to which the UE belongs any longer. In the case that the information about the region to which the UE belongs has not been reported yet, it may be reported immediately.

In FIG. 7, the information about the position of UE1 and the region to which UE1 belongs is stored by the local control node 1, and the information about the position of UE2 and UE3 and the region to which the UE2 and UE3 belong is stored by the local control node 2.

The information about the position of the UE and the region to which the UE belongs will be updated as follows.

An updating process may mainly include a position updating process in the case that the UE is located within the coverage of an identical local control node, and a position updating process in the case that the UE is located within the coverage of different local control nodes.

1. The position updating process in the case that the UE is located within the coverage of an identical local control node In the case that the UE moves within the coverage of an identical local control node, because the uplink position signal may be transmitted periodically or due to the division of the regions, usually the access node may merely filter out the uplink position signal repeatedly transmitted within a very short time period (e.g., several or dozens of milliseconds), and this repeated transmission aims to ensure the reception success rate. In the case that the information about the position of the UE and the region to which the UE belongs is reported by the access node again but the local control node determines that the UE was previously managed by the local control node and the position information of the UE has been reported to the core network controller or an interval between the previous reporting operation and the current reporting operation does not meet a predetermined threshold, it is deemed that the position is updated for the local control node in turn, and it is unnecessary to report the position information of the UE to the core network controller, and instead, merely the information about the access node to which the UE belongs may be updated in the local access node.

Of course, for the position updating process in the case that the UE is located within the coverage of an identical local control node, the position information may be reported again based on a configuration switch or a fail-timer. The repeated reporting may help the core network controller to determine whether or not the position updating process performed in the case that the UE is located within the coverage of different local control nodes occurs. The so-called configuration switch may be configured by the core network control node so as to determine whether or not the position update of the UE within the coverage of an identical local control node needs to be reported repeatedly. In the case that the switch is in an on state, the position of the UE may be reported repeatedly, and in the case that the switch is in an off state, it may not be reported repeated. The so-called "fail-timer" may be configured to determine whether or not an interval between two reporting processes for reporting the same information meets a predetermined threshold. In the case that the interval does not meet the predetermined threshold, the position information of the UE may not be reported, and in the case that the interval meets the predetermined threshold, the position information of the UE needs to be reported again.

2. The position updating process in the case that the UE is located within the coverage of different local control nodes Usually, this position updating process can merely be found by the core network controller.

In the case that a new position signal is transmitted by the UE and it has been reported by the access node to the local control node and then reported to the core network controller by the local control node, the core network controller may update the position information or path information of the UE stored therein.

The core network controller may find that the local control node to which the UE belongs has been changed. For example, in the case that a old local control node does not report the position information of the UE (in the case that the position information of the UE must be updated and reported), it means the UE has moved out of the coverage of the old local control node and into the coverage of a new local control node. At this time, for the purpose of optimization, the core network controller may notify the old local control node that the UE has moved out of its coverage through a signaling, and the relevant record about the UE stored in the previously local control node may be canceled.

The core network controller may further determine whether or not the information stored in the previous control node is invalid in accordance with the position relationship between the new local control node and the old local control node, or in accordance with a storage time limit. For example, if there is an obvious or large distance between the new local control node and the old local control node, it means that the UE that has moved into the coverage of the new local control node cannot belong to the old local control node, and the information stored in the old local control node is invalid. In addition, in the case that the information stored in the old local control node is not confirmed or updated for a long time period greater than a predetermined value, it means that the information stored in the old local control node is invalid and may be canceled. In a possible embodiment of the present disclosure, the core network control node may notify the old local control node that the information stored therein may be canceled.

In the case of a downlink addressing or paging operation of the UE, usually this operation may be initiated by the core network controller or an element at a higher layer. The position information or path information of the UE which belongs to the local control node may be found in the core network controller. The paging message for the UE may be issued to the corresponding local control node in accordance with the position information or path information. Upon the receipt of the paging message, the local control node may determine the local access nodes to which the UE belongs in accordance with the position information stored therein, and forward the paging message to these access nodes, and these access nodes may transmit the paging message to the UE. Then, a link may be established between the UE and the network for the normal communication.

The above-mentioned embodiment is provided on the basis of the two-layer network architecture. In fact, there is no strict relationship between the network architecture and the transmission of the uplink position signal by the UE. Any other network architecture may cooperate with the tow-layer network architecture, as long as the uplink position signal transmitted by the UE may be parsed, transmitted and managed in a better manner for the subsequent operations such as paging the called UE.

Based on an identical inventive concept, the present disclosure further provides in some embodiments a UE, a network node, a local control node and a core network controller. The principles for the UE, the network node, the local control node and the core network control to solve the problems are similar to those for the above-mentioned addressing methods, so the implementations thereof may refer to those mentioned above and thus will not be particularly defined herein.

Figure 8:
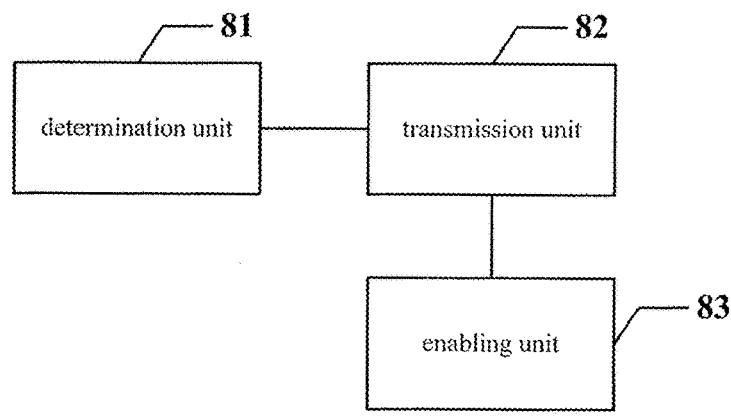
FIG. 8 is a schematic view showing a UE according to one embodiment of the present disclosure.

Referring to FIG. 8, the present disclosure provides in some embodiments a UE, which includes: a determination unit 81 configured to determine configuration information of an uplink position signal; and a transmission unit 82 configured to transmit the uplink position signal carrying an identifier of the UE to a network side in accordance with the determined configuration information, so as to enable the network side to determine addressing information of the UE in accordance with the identifier of the UE, and address the UE in accordance with the identifier and the addressing information of the UE in the case that it is necessary to address the UE.

In a possible embodiment of the present disclosure, the determination unit 81 is further configured to receive the configuration information of the uplink position signal issued by the network side, or interact with the network side to determine the configuration information of the uplink position signal.

In a possible embodiment of the present disclosure, the UE further includes an enabling unit 83 configured to, before the transmission unit transmits the uplink position signal carrying an identifier of the UE to the network side in accordance with the determined configuration information, enable a function of transmitting the uplink position signal in accordance with a signaling received from the network side after it has determined that the function of transmitting the uplink position signal needs to be enabled.

In a possible embodiment of the present disclosure, the enabling unit 83 is further configured to determine that the function of transmitting the uplink position signal needs to be enabled after it has received a predetermined common signaling or a signaling instructing the UE to enable the function of transmitting the uplink position signal.

In a possible embodiment of the present disclosure, the transmission unit 82 is further configured to periodically transmit the uplink position signal carrying an identifier of the UE to the network side in accordance with the determined configuration information; or transmit the uplink position signal carrying an identifier of the UE to the network side in accordance with the determined configuration information in the case that a predetermined triggering condition has been met.

In a possible embodiment of the present disclosure, the predetermined triggering condition includes at least one of following conditions: a location area where the UE is located has been changed; a frequency point used by the UE has been changed; a cell where the UE is located is of a predetermined type; and the UE has received a reporting instruction from the network side.

In a possible embodiment of the present disclosure, the transmission unit 82 is further configured to transmit the uplink position signal carrying the identifier of the UE that has been encrypted to the network side in accordance with the determined configuration information.

Figure 9:
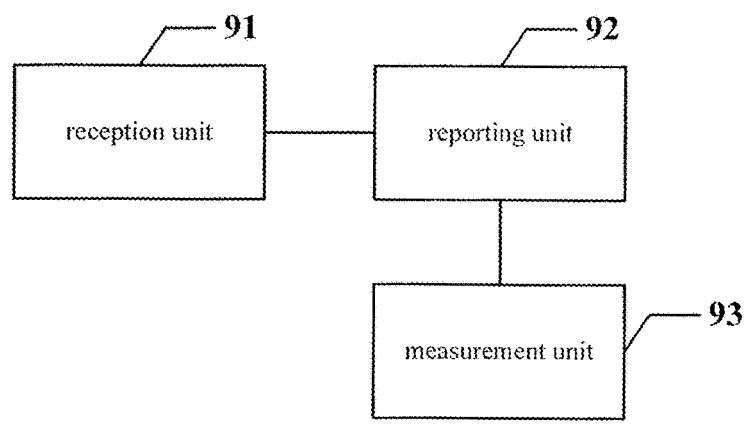
FIG. 9 is a schematic view showing an access node according to one embodiment of the present disclosure.

Referring to FIG. 9, the present disclosure provides in some embodiments an access node which includes: a reception unit 91 configured to receive an uplink position signal carrying an identifier of a UE; and a reporting unit 92 configured to report the identifier of the UE and first addressing information for the UE to an upper-layer network node, so as to enable the upper-layer network node to address the UE in accordance with the identifier of the UE and the first addressing information for the UE in the case that it is necessary to address the UE.

In a possible embodiment of the present disclosure, the access node further includes a measurement unit 93 configured to measure quality of the received uplink position signal after the reception unit has received the uplink position signal carrying the identifier of the UE and before the reporting unit has reported the identifier of the UE and the first addressing information for the UE to the upper-layer network node. The reporting unit 92 is further configured to determine the first addressing information in the case that the measured quality of the received uplink position signal has met a predetermined threshold.

In a possible embodiment of the present disclosure, the reporting unit 92 is further configured to determine a coverage of the access node and/or an identifier of the access node as the first addressing information.

Figure 10A:
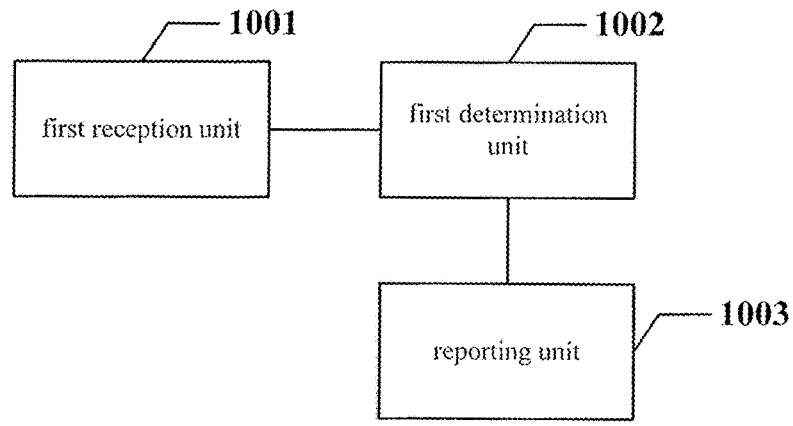
FIG. 10A is a schematic view showing a local control node according to one embodiment of the present disclosure.

Referring to FIG. 10A, the present disclosure provides in some embodiments a local control node, which includes: a first reception unit 1001 configured to receive an identifier of a UE reported by an access node; a first determination unit 1002 configured to determine second addressing information in accordance with the received identifier of the UE; and a reporting unit 1003 configured to report the determined second addressing information to a core network controller, so as to enable the core network controller to address the UE in accordance with the second addressing information in the case that it is necessary to address the UE.

Figure 10B:
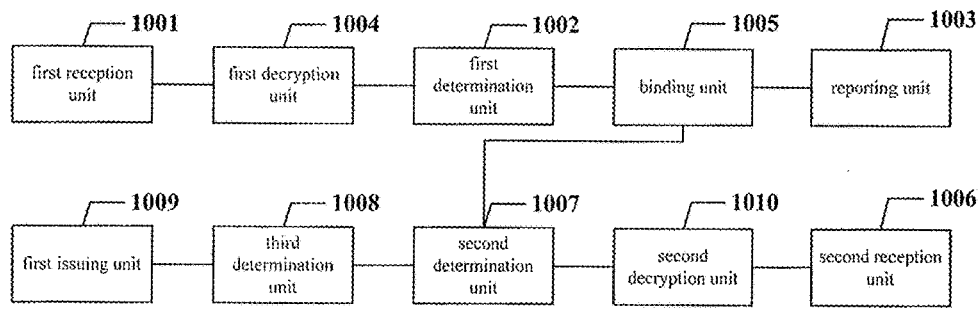
FIG. 10B is another schematic view showing the local control node according to one embodiment of the present disclosure.
Figure 10C:
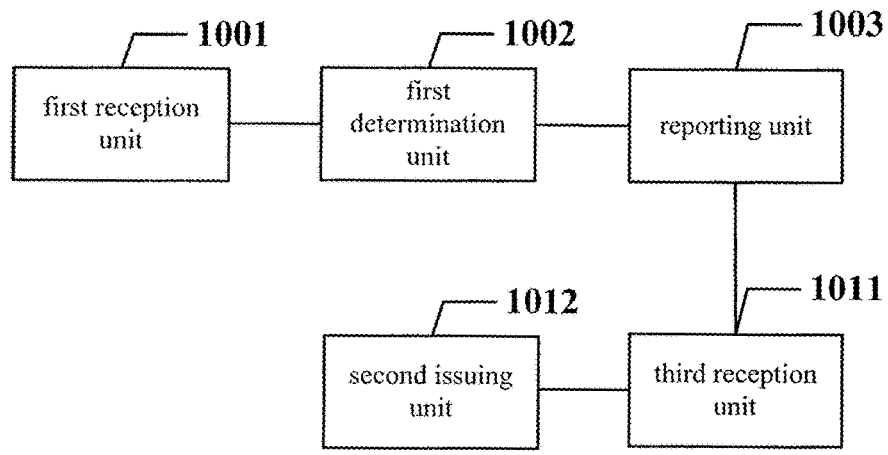
FIG. 10C is yet another schematic view showing the local control node according to one embodiment of the present disclosure.

Based on the local control node in FIG. 10A, the present disclosure further provides in some embodiments other two local control nodes as shown in FIGS. 10B and 10C respectively.

Referring to FIG. 10B, the local control node includes the first reception unit 1001, the first determination unit 1002, the reporting unit 1003, a first decryption unit 1004, a binding unit 1005, a second reception unit 1006, a second determination unit 1007, a third determination unit 1008, a first issuing unit 1009 and a second decryption unit 1010.

In a possible embodiment of the present disclosure, the first reception unit 1001 is further configured to receive first addressing information reported by the access node. The first determination unit 1002 is further configured to determine an identifier of the local control node and the received identifier of the UE as the second addressing information, or determine the identifier of the local control node, the received identifier of the UE and the first addressing information for the UE as the second addressing information.

In a possible embodiment of the present disclosure, the first decryption unit 1004 is configured to, before the first determination unit determines an identifier of the local control node and the received identifier of the UE as the second addressing information, in the case that the received identifier of the UE has been encrypted, decrypt the encrypted identifier of the UE in accordance with decryption configuration information so as to acquire the identifier of the UE.

In a possible embodiment of the present disclosure, the binding unit 1005 is configured to, after the first determination units has determined an identifier of the local control node and the identifier of the UE as the second addressing information, bind the received identifier of the UE and the first addressing information for the UE to each other.

In a possible embodiment of the present disclosure, the second reception unit 1006 is configured to, after the reporting unit has reported the determined second addressing information to the core network controller, receive an addressing indicator including the identifier of the UE issued by the core network controller. The second determination unit 1007 is configured to determine the first addressing information for the UE corresponding to the received identifier of the UE in accordance with the identifier of the UE and the first addressing information for the UE which have been bound to each other. The third determination unit 1008 is configured to determine a corresponding access node in accordance with the determined first addressing information. The first issuing unit 1009 is configured to issue the addressing indicator including the received identifier of the UE to the access node determined by the third determination unit, so as to enable the access node to issue a paging message or downlink data in accordance with the addressing indicator including the received identifier of the UE.

In a possible embodiment of the present disclosure, the second decryption unit 1010 is configured to, after the second reception unit 1006 has received the addressing indicator including the identifier of the UE issued by the core network controller and before the second determination unit 1007 has determined the first addressing information for the UE corresponding to the received identifier of the UE in accordance with the identifier of the UE and the first addressing information for the UE which have been bound to each other, in the case that the received identifier of the UE has been encrypted, decrypt the encrypted identifier of the UE in accordance with its own decryption configuration information so as to acquire the identifier of the UE.

Referring to FIG. 10C, the present disclosure provides in some embodiments the local control node including the first reception unit 1001, the first determination unit 1002, the reporting unit 1003, a third reception unit 1011 and a second issuing unit 1012.

In a possible embodiment of the present disclosure, the third reception unit 1011 is configured to, after the reporting unit has reported the determined second addressing information to the core network controller, receive an addressing indicator including the identifier of the UE and an identifier of an access node issued by the core network controller. The second issuing unit 1012 is configured to issue the addressing indicator including the received identifier of the UE to the access node corresponding to the identifier of the access node, so as to enable the access node to issue a paging message or downlink data in accordance with the addressing indicator including the received identifier of the UE.

Figure 11A:
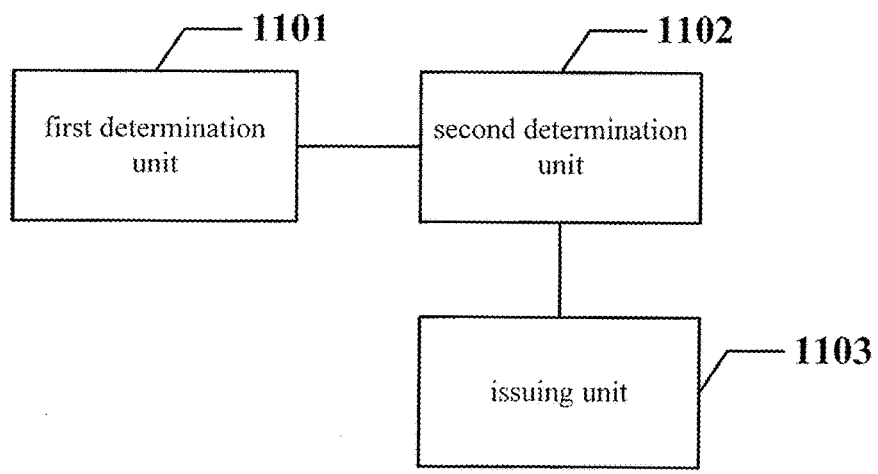
FIG. 11A is a schematic view showing a core network controller according to one embodiment of the present disclosure.

Referring to FIG. 11A, the present disclosure provides in some embodiments a core network controller, which includes: a first determination unit 1101 configured to determine an identifier of a UE which needs to be addressed; a second determination unit 1102 configured to determine a local control node to which the UE belongs in accordance with second addressing information received from the local control node; and an issuing unit 1103 configured to issue an addressing indicator including the identifier of the UE to the determined local control node, so as to enable the local control node to address the UE in accordance with the received identifier of the UE.

Figure 11B:
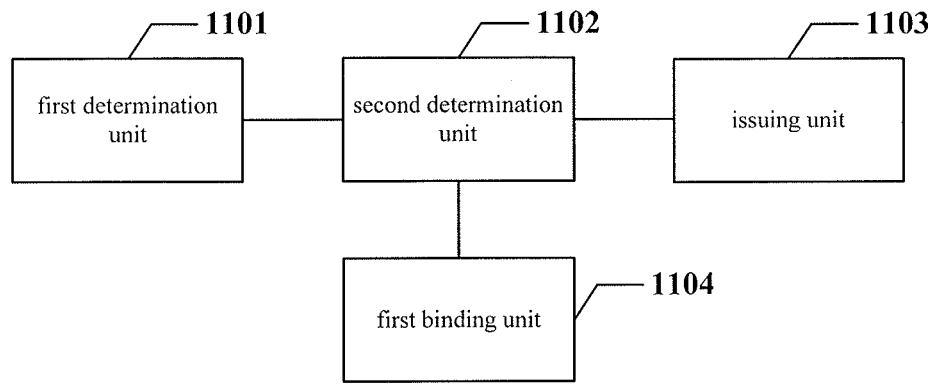
FIG. 11B is another schematic view showing the core network controller according to one embodiment of the present disclosure.
Figure 11C:
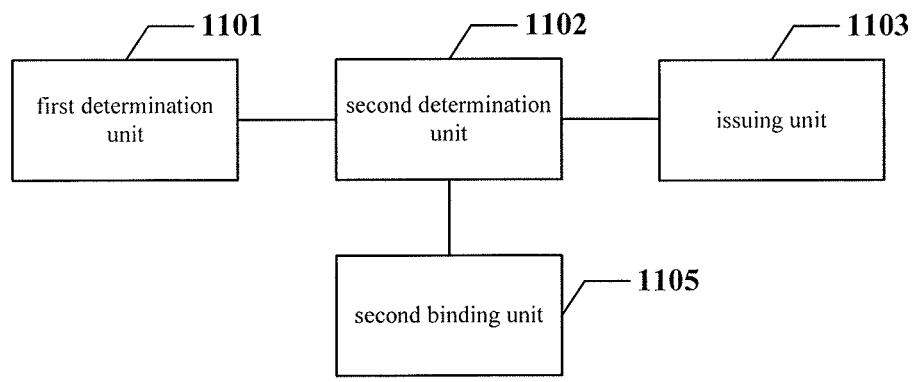
FIG. 11C is yet another schematic view showing the core network controller according to one embodiment of the present disclosure.

Based on the core network controller in FIG. 11A, the present disclosure further provides in some embodiments other two core network controllers as shown in FIGS. 11B and 11C respectively.

Referring to FIG. 11B, the present disclosure provides in some embodiments the core network controller including the first determination unit 1101, the second determination unit 1102, the issuing unit 1103 and a first binding unit 1104.

In a possible embodiment of the present disclosure, the second addressing information includes the identifier of the UE and an identifier of the local control node. The first binding unit 1104 is configured to, before the first determination unit has determined the identifier of the UE which needs to be addressed, bind the received identifier of the UE and the identifier of the local control node to each other. The second determination unit 1102 is further configured to determine the identifier of the local control node corresponding to the identifier of the UE which needs to be addressed in accordance with the identifier of the UE and the identifier of the local control node which have been bound to each other by the binding unit, and determining, by the core network controller, the local control node to which the UE belongs in accordance with the determined identifier of the local control node.

Referring to FIG. 11C, the present disclosure provides in some embodiments the core network controller including the first determination unit 1101, the second determination unit 1102, the issuing unit 1103 and a second binding unit 1105.

In a possible embodiment of the present disclosure, the second addressing information includes the identifier of the UE, an identifier of the local control node and an identifier of an access node. The second binding unit 1105 is configured to, before the first determination unit has determined the identifier of the UE which needs to be addressed, bind the received identifier of the UE, the received identifier of the local control node and the received identifier of the access node to each other. The second determination unit 1102 is further configured to determine the identifier of the local control node and the identifier of the access node corresponding to the identifier of the UE which needs to be addressed in accordance with the identifier of the UE, the identifier of the local control node and the identifier of the access node which have been bound to each other by the binding unit, and determine the local control node to which the UE belongs in accordance with the determined identifier of the local control node. The issuing unit 1103 is further configured to issue an addressing indicator including the identifier of the UE and the determined identifier of the access node to the determined local control node.

The structures and processings of the UE and the network side devices will be described hereinafter in conjunction with preferred hardware structures.

Figure 12:
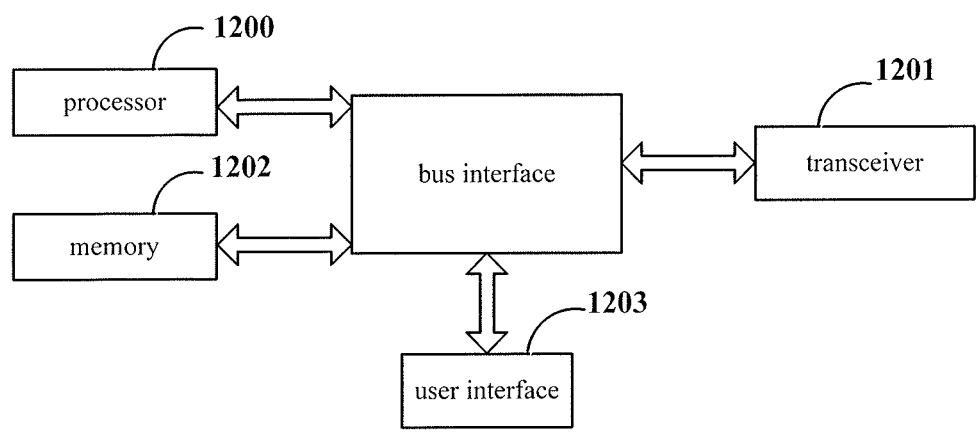
FIG. 12 is a schematic view showing another UE according to one embodiment of the present disclosure.

Referring to FIG. 12, the present disclosure provides in some embodiments the UE including a processor 1200, a transceiver 1201, a memory 1202 and a user interface 1203. The processor 1200 is configured to read a program stored in the memory 1202, so as to determine configuration information of an uplink position signal, transmit the uplink position signal carrying an identifier of the UE to a network side through the transceiver 1201 in accordance with the determined configuration information, thereby to enable the network side to determine addressing information of the UE in accordance with the identifier of the UE, and address the UE in accordance with the identifier and the addressing information of the UE in the case that it is necessary to address the UE. The transceiver 1201 is configured to receive and transmit data under the control of the processor 1200.

In a possible embodiment of the present disclosure, the processor 1200 is further configured to read the program stored in the memory 1202 so as to receive, through the transceiver 1201, the configuration information of the uplink position signal issued by the network side, or interact, through the transceiver 1201, with the network side to determine the configuration information of the uplink position signal.

In a possible embodiment of the present disclosure, the processor 1200 is further configured to read the program stored in the memory 1202, so as to, before the uplink position signal carrying the identifier of the UE has been transmitted to the network side in accordance with the determined configuration information, enable a function of transmitting the uplink position signal in accordance with a signaling received by the transceiver 1201 from the network side after it has determined that the function of transmitting the uplink position signal needs to be enabled.

In a possible embodiment of the present disclosure, the processor 1200 is further configured to read the program stored in the memory 1202, so as to determine that the function of transmitting the uplink position signal needs to be enabled after a predetermined common or a signaling instructing the UE to enable the function of transmitting the uplink position signal has been received through the transceiver 1201.

In a possible embodiment of the present disclosure, the processor 1200 is further configured to read the program stored in the memory 1202, so as to periodically transmit, through the transceiver 1201, the uplink position signal carrying the identifier of the UE to the network side in accordance with the determined configuration information; or transmit, through the transceiver 1201, the uplink position signal carrying the identifier of the UE to the network side in accordance with the determined configuration information in the case that a predetermined triggering condition has been met.

In a possible embodiment of the present disclosure, the processor 1200 is further configured to read the program stored in the memory 1202, so as to, in the case that the predetermined triggering condition includes parts or all of that a location area where the UE is located has been changed, that a frequency point used by the UE has been changed, that a cell where the UE is located is of a predetermined type, and that the UE has received a reporting instruction from the network side, transmit, through the transceiver 1201, the uplink position signal carrying the identifier of the UE to the network side in accordance with the determined configuration information.

In a possible embodiment of the present disclosure, the processor 1200 is further configured to read the program stored in the memory 1202, so as to transmit, through the transceiver 1201, the uplink position signal carrying the identifier of the UE that has been encrypted to the network side in accordance with the determined configuration information.

In FIG. 12, bus architecture may include a number of buses and bridges connected to each other, so as to connect various circuits for one or more processors such as the processor 1200 and one or more memories such as the memory 1202. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 1201 may consist of more than one element, i.e. a transmitter and a receiver for communication with any other devices over a transmission medium. With respect to different UEs, a user interface 1203 may also be provided for devices which are to be arranged inside or outside the UE, and these devices may include but not limited to a keypad, a display, a speaker, a microphone and a joystick. The processor 1200 may take charge of managing the bus architecture as well as general processings. The memory 1202 may store therein data for the operation of the processor 1200.

Figure 13:
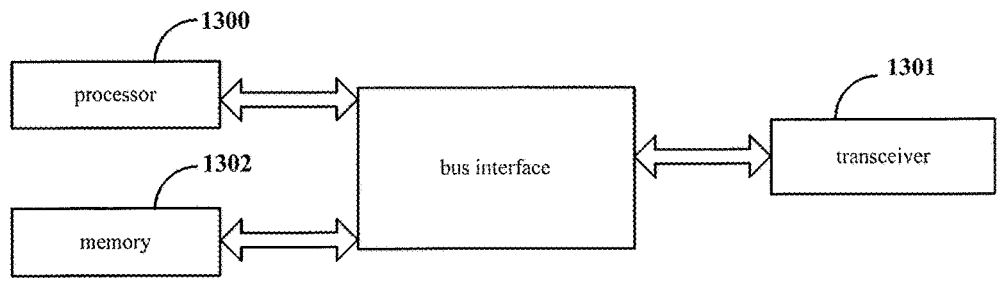
FIG. 13 is a schematic view showing another access node according to one embodiment of the present disclosure.

Referring to FIG. 13, the present disclosure provides in some embodiments the access node including a processor 1300, a transceiver 1301 and a memory 1302 which communicate with each other through a bus interface. The processor 1300 is configured to read a program stored in the memory 1302, so as to receive, by the access node through the transceiver 1301, an uplink position signal carrying an identifier of a UE, and report, through the transceiver 1301, the identifier of the UE and first addressing information for the UE to an upper-layer network node, thereby to enable the upper-layer network node to address the UE in accordance with the identifier of the UE and the first addressing information for the UE in the case that it is necessary to address the UE. The transceiver 1301 is configured to receive and transmit data under the control of the processor 1300.

In a possible embodiment of the present disclosure, the processor 1300 is configured to read the program stored in the memory 1302, so as to, after the uplink position signal carrying the identifier of the UE has been received through the transceiver 1301 and before the identifier of the UE and the first addressing information for the UE has been reported through the transceiver 1301 to the upper-layer network node, measure quality of the received uplink position signal, and determine the first addressing information in the case that the measured quality of the received uplink position signal has met a predetermined threshold.

In a possible embodiment of the present disclosure, the processor 1300 is further configured to read the program stored in the memory 1302, so as to enable the access node to determine a coverage of the access node and/or an identifier of the access node as the first addressing information.

In FIG. 13, the bus architecture may include a number of buses and bridges connected to each other, so as to connect various circuits for one or more processors such as the processor 1300 and one or more memories such as the memory 1302. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 1301 may consist of more than one element, i.e. a transmitter and a receiver for communication with any other devices over a transmission medium. The processor 1300 may take charge of managing the bus architecture as well as general processings. The memory 1302 may store therein data for the operation of the processor 1300.

Figure 14:
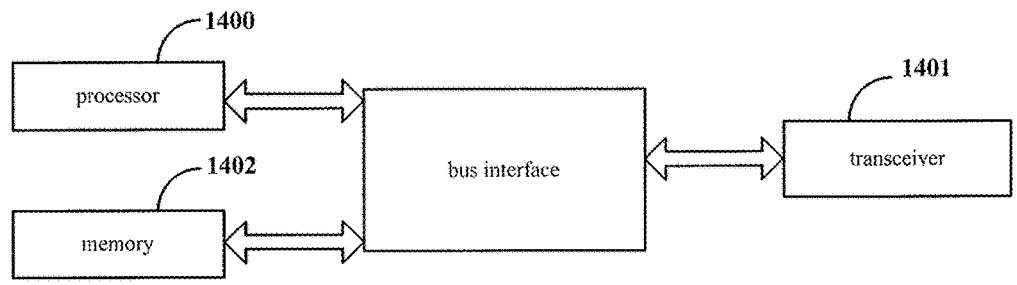
FIG. 14 is a schematic view showing another local control node according to one embodiment of the present disclosure.

Referring to FIG. 14, the present disclosure provides in some embodiments the local control node including a processor 1400, a transceiver 1401 and a memory 1402, which communicate with each other through a bus interface.

In a possible embodiment of the present disclosure, the processor 1400 is configured to read a program stored in the memory 1402, so as to receive, through the transceiver 1401, an identifier of a UE reported by an access node, determine second addressing information in accordance with the identifier of the UE received by the transceiver 1401, and report, through the transceiver 1401, the determined second addressing information to a core network controller, thereby to enable the core network controller to address the UE in accordance with the second addressing information in the case that it is necessary to address the UE. The transceiver 1401 is configured to receive and transmit data under the control of the processor 1400.

In a possible embodiment of the present disclosure, the processor 1400 is further configured to read the program stored in the memory 1402, so as to receive, through the transceiver 1401, first addressing information reported by the access node, and determine an identifier of the local control node and the received identifier of the UE as the second addressing information, or determine the identifier of the local control node, the received identifier of the UE and the first addressing information for the UE as the second addressing information.

In a possible embodiment of the present disclosure, the processor 1400 is further configured to read the program stored in the memory 1402, so as to, before the first determination unit determines the identifier of the local control node and the identifier of the UE received by the transceiver 1401 as the second addressing information, in the case that the identifier of the UE received by the transceiver 1401 has been encrypted, decrypt the encrypted identifier of the UE in accordance with decryption configuration information so as to acquire the identifier of the UE.

In a possible embodiment of the present disclosure, the processor 1400 is further configured to read the program stored in the memory 1402, so as to, after determining the identifier of the local control node and the identifier of the UE received by the transceiver 1401 as the second addressing information, bind the received identifier of the UE and the first addressing information for the UE to each other.

In a possible embodiment of the present disclosure, the processor 1400 is further configured to read the program stored in the memory 1402, so as to, after the determined second addressing information has been reported through the transceiver 1401 to the core network controller, receive through the transceiver 1401 an addressing indicator including the identifier of the UE issued by the core network controller, determine the first addressing information for the UE corresponding to the received identifier of the UE in accordance with the identifier of the UE and the first addressing information for the UE which have been bound to each other, determine a corresponding access node in accordance with the determined first addressing information, and issue through the transceiver 1401 the addressing indicator including the received identifier of the UE to the determined access node, so as to enable the access node to issue a paging message or downlink data in accordance with the addressing indicator including the received identifier of the UE.

In a possible embodiment of the present disclosure, the processor 1400 is further configured to read the program stored in the memory 1402, so as to, after the addressing indicator including the identifier of the UE issued by the core network controller has been received through the transceiver 1401, and before the first addressing information for the UE corresponding to the received identifier of the UE has been determined in accordance with the identifier of the UE and the first addressing information for the UE which have been bound to each other, enable the local control node to decrypt the encrypted identifier of the UE in accordance with its own decryption configuration information so as to acquire the identifier of the UE in the case that the received identifier of the UE has been encrypted.

In a possible embodiment of the present disclosure, the processor 1400 is further configured to read the program stored in the memory 1402, so as to, after the determined second addressing information has been reported to the core network controller, receive through the transceiver 1401 an addressing indicator including the identifier of the UE and an identifier of an access node issued by the core network controller, and issue through the transceiver 1401 the addressing indicator including the received identifier of the UE to the access node corresponding to the identifier of the access node, thereby to enable the access node to issue a paging message or downlink data in accordance with the addressing indicator including the received identifier of the UE.

In FIG. 14, the bus architecture may include a number of buses and bridges connected to each other, so as to connect various circuits for one or more processors such as the processor 1400 and one or more memories such as the memory 1402. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 1401 may consist of more than one element, i.e. a transmitter and a receiver for communication with any other devices over a transmission medium. The processor 1400 may take charge of managing the bus architecture as well as general processings. The memory 1402 may store therein data for the operation of the processor 1400.

Figure 15:
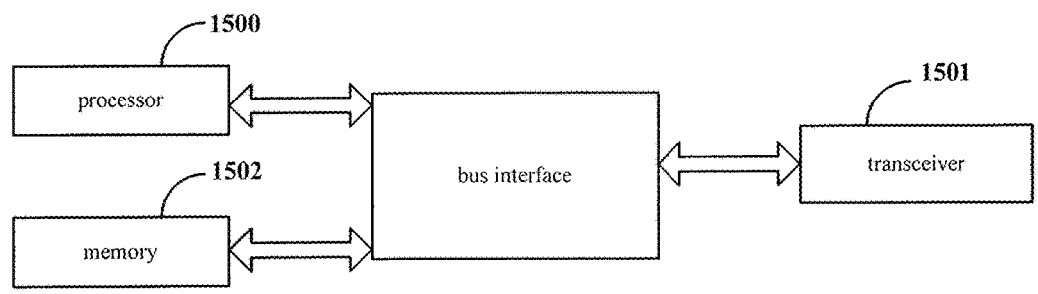
FIG. 15 is a schematic view showing another core network controller according to one embodiment of the present disclosure.

Referring to FIG. 15, the present disclosure provides in some embodiments the core network controller including a processor 1500, a transceiver 1501 and a memory 1502, which communicate with each other through a bus interface.

In a possible embodiment of the present disclosure, the processor 1500 is configured to read a program stored in the memory 1502, so as to determine an identifier of a UE which needs to be addressed, determine a local control node to which the UE belongs in accordance with second addressing information received through the transceiver 1501 from the local control node, and issue through the transceiver 1501 an addressing indicator including the identifier of the UE to the determined local control node, thereby to enable the local control node to address the UE in accordance with the received identifier of the UE. The transceiver 1501 is configured to receive and transmit data under the control of the processor 1500.

In a possible embodiment of the present disclosure, the second addressing information includes the identifier of the UE and an identifier of the local control node. The processor 1500 is further configured to read the program stored in the memory 1502, so as to, before the identifier of the UE which needs to be addressed has been determined, bind the identifier of the UE received through the transceiver 1501 to the identifier of the local control node, determine the identifier of the local control node corresponding to the identifier of the UE which needs to be addressed in accordance with the identifier of the UE and the identifier of the local control node which have been bound to each other, and determine the local control node to which the UE belongs in accordance with the determined identifier of the local control node.

In a possible embodiment of the present disclosure, the second addressing information includes the identifier of the UE, an identifier of the local control node and an identifier of an access node. The second addressing information includes the identifier of the UE and an identifier of the local control node. The processor 1500 is further configured to read the program stored in the memory 1502, so as to, before the identifier of the UE which needs to be addressed has been determined, bind the identifier of the UE received through the transceiver 1501, the identifier of the local control node and the identifier of the access node to each other, determine the identifier of the local control node and the identifier of the access node corresponding to the identifier of the UE which needs to be addressed in accordance with the identifier of the UE, the identifier of the local control node and the identifier of the access node which have been bound to each other, determine the local control node to which the UE belongs in accordance with the determined identifier of the local control node, and issue through the transceiver 1501 an addressing indicator including the identifier of the UE and the determined identifier of the access node to the determined local control node.

In FIG. 15, bus architecture may include a number of buses and bridges connected to each other, so as to connect various circuits for one or more processors such as the processor 1500 and one or more memories such as the processor 1502. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 1501 may consist of more than one element, i.e. a transmitter and a receiver for communication with any other devices over a transmission medium. The processor 1500 may take charge of managing the bus architecture as well as general processings. The memory 1502 may store therein data for the operation of the processor 1500.

Obviously, a person skilled in the art may make further modifications and improvements without departing from the spirit of the present disclosure, and these modifications and improvements shall also fall within the scope of the present disclosure.

What is claimed is:

1. An addressing method for one User Equipment (UE) in an Ultra Dense Network (UDN), comprising:
    determining, by the UE, configuration information of an uplink position signal of the UE to be transmitted to a network side in the UDN; and
    transmitting, by the UE, the uplink position signal carrying an identifier of the UE to the network side in accordance with the determined configuration information, to enable the network side to determine addressing information of the UE in accordance with the identifier of the UE, and address the UE in accordance with the identifier and the addressing information of the UE in the case that it is necessary to address the UE,
    wherein prior to transmit by the LE the uplink position signal carrying the identifier of the UE to the network side in accordance with the determined configuration information, the addressing method further comprises:
    enabling, by the UE, a function of transmitting the uplink position signal in accordance with a signaling received from the network side,
    wherein the signaling received from the network side is a predetermined common signaling or a signaling instructing the UE to enable the function of transmitting the uplink position signal.

2. The addressing method according to claim 1, wherein transmitting by the UE the uplink position signal carrying the identifier of the UE to the network side in accordance with the determined configuration information comprises:
    periodically transmitting, by the UE, the uplink position signal carrying the identifier of the UE to the network side in accordance with the determined configuration information; or
    transmitting, by the UE, the uplink position signal carrying the identifier of the UE to the network side in accordance with the determined configuration information in the case that a predetermined triggering condition has been met,
    the predetermined triggering condition comprises at least one of following conditions:
    a location area where the UE is located has been changed;
    a frequency point used by the UE has been changed;
    a cell where the UE is located is of a predetermined type; and
    the UE has received a reporting instruction from the network side.

3. The addressing method according to claim 1, wherein transmitting by the UE the uplink position signal carrying the identifier of the UE to the network side in accordance with the determined configuration information comprises:
    transmitting, by the UE, the uplink position signal carrying the identifier of the UE that has been encrypted to the network side in accordance with the determined configuration information.

4. The addressing method according to claim 1, wherein determining by the UE the configuration information of the uplink position signal of the UE to be transmitted to the network side in the UDN comprises:
    receiving, by the UE, the configuration information of the uplink position signal issued by the network side; or
    interacting, by the UE, with the network side to determine the configuration information of the uplink position signal.

5. One User Equipment (UE) in an Ultra Dense Network (UDN), comprising:
    a processor; and
    a memory connected to the processor through a bus interface and configured to store therein a program and data for the operation of the processor, wherein
    the processor is configured to call and execute the program and data stored in the memory, to:
    determine configuration information of an uplink position signal of the UE to be transmitted to a network side in the UDN; and transmit the uplink position signal carrying an identifier of the UE to the network side in accordance with the determined configuration information, to enable the network side to determine addressing information of the UE in accordance with the identifier of the UE, and address the UE in accordance with the identifier and the addressing information of the UE in the case that it is necessary to address the UE,
    wherein the processor is further configured to:
    before the processor has transmitted the uplink position signal carrying an identifier of the UE to the network side in accordance with the determined configuration information, enable a function of transmitting e uplink position signal in accordance with a signaling received from the network side,
    wherein the signaling received from the network side is a predetermined common signaling or a signaling instructing the UE to enable the function of transmitting the uplink position signal.

6. The UE according to claim 5, wherein the processor is further configured to periodically transmit the uplink position signal carrying an identifier of the UE to the network side in accordance with the determined configuration information; or transmit the uplink position signal carrying an identifier of the UE to the network side in accordance with the determined configuration information in the case that it determines a predetermined triggering condition has been met,
    wherein the predetermined triggering condition comprises at least one of following conditions: a location area where the UE is located has been changed; a frequency point used by the UE has been changed; a cell where the UE is located is of a predetermined type; and the UE has received a reporting instruction from the network side.

7. The UE according to claim 5, wherein the processor is further configured to transmit the uplink position signal carrying the identifier of the UE that has been encrypted to the network side in accordance with the determined configuration information.

8. The UE according to claim 5, wherein the processor is further configured to receive the configuration information of the uplink position signal issued by the network side, or interact with the network side to determine the configuration information of the uplink position signal.

* * * * *